United States Patent
Okuma

(10) Patent No.: US 12,521,450 B2
(45) Date of Patent: Jan. 13, 2026

(54) DNA, EXPRESSION VECTOR, TRANSCRIPT, CELL, PHARMACEUTICAL COMPOSITION, AND MEDICINE

(71) Applicant: Hitachi, Ltd., Tokyo (JP)

(72) Inventor: Atsushi Okuma, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1037 days.

(21) Appl. No.: 17/576,827

(22) Filed: Jan. 14, 2022

(65) Prior Publication Data

US 2022/0226505 A1 Jul. 21, 2022

(30) Foreign Application Priority Data

Jan. 15, 2021 (JP) ................................. 2021-005052
Oct. 14, 2021 (JP) ................................. 2021-169004

(51) Int. Cl.
| | |
|---|---|
| *A61K 48/00* | (2006.01) |
| *C12N 9/12* | (2006.01) |
| *C12N 9/64* | (2006.01) |
| *C12N 9/78* | (2006.01) |
| *C12N 15/86* | (2006.01) |

(52) U.S. Cl.
CPC ........ *A61K 48/0058* (2013.01); *C12N 9/1211* (2013.01); *C12N 9/6472* (2013.01); *C12N 9/78* (2013.01); *C12N 15/86* (2013.01); *C12Y 207/01021* (2013.01); *C12Y 304/22062* (2013.01); *C12Y 305/04001* (2013.01)

(58) Field of Classification Search
None
See application file for complete search history.

(56) References Cited

U.S. PATENT DOCUMENTS

2024/0018513 A1    1/2024  Bradley et al.

FOREIGN PATENT DOCUMENTS

WO         2022087427 A1     4/2022

OTHER PUBLICATIONS

Zaragoulidis et al. "Suicide Gene Therapy: Current Strategies". J Genet Syndr Gene Ther (Year: 2013).*
Zhou et al., "The biological function and clinical significance of SF3B1 mutations of cancer". Biomarker Research (Year: 2020).*
Wan "SF3B1 mutations in chronic lymphocytic leukemia" Blood (Year: 2013).*
Walther, "Current Strategies in Cancer Gene Therapy" 3. Bacterial Toxins in Cancer Therapy (Year: 2016).*
Gargett & Brown, "The inducible caspase-9 suicide gene system as a safety "switch" to limit off target, off tumor toxicities of chimeric antigen receptor T cells". Front Pharmacol (Year: 2014).*
Lillehammer et al., "melanoma-specific expression in first-generation adenoviral vectors in vitro and in vivo-use of the human tyosinase promoter with human enhancers" Cancer Gene Therapy (Year: 2005).*
Everson et al. "Efficacy and safety of clinically relevant foamy vector design in human hematopoietic repopulating cells" J Gene Med (Year: 2018).*
Pourzadegan et al., "Using intron splicing trick for preferential gene expression in transduced cells: an approach for suicide gene therapy". Cancer Gene Therapy (Year: 2016).*
Kenichi Yoshida et al., "Frequent pathway mutations of splicing machinery in myelodysplasia" Nature 478:64-69 (2011).
Dolatshad et al., "Cryptic splicing events in the iron transporter ABCB7 and other key target genes in SF3B1-mutant myelodysplastic syndromes" Leukemia 30:2322-2331 (2016).
Daichi Inoue et al., "Spliceosomal disruption of the non-canonical BAF complex in cancer" Nature 574(7778):432-436 (2019).
Lili Wang et al., "Transcriptomic Characterization of SF3B1 Mutation Reveals Its Pleiotropic Effects in Chronic Lymphocytic Leukemia" Cancer Cell 30:750-763 (2016).
Gruber et al., "Spliceosome-Mediated RNA Trans-Splicing Facilitates Targeted Delivery of Suicide Genes to Cancer Cells", American Association for Cancer Research, 2011, in 9 pages.
Japanese Patent Office, Office Action, Application No. 2021-169004, dated May 13, 2025, in 8 pages.
North K., Mechanistic consequences of splicing factor mutations and their use for targeted cancer therapy, A dissertation submitted in partial fulfillment of the requirements for the degree of Doctor of Philosophy (University of Washington) [online], 2020,pp. 1-132, Internet <URL: https://www.proquest.com/openview/1e5f7d0d7d3e698d872d1199483e018b/.

* cited by examiner

*Primary Examiner* — Robert M Kelly
*Assistant Examiner* — John David Moore
(74) *Attorney, Agent, or Firm* — PROCOPIO, CORY, HARGREAVES & SAVITCH LLP

(57) ABSTRACT

An object of the invention is to provide a novel pharmaceutical composition. The pharmaceutical composition of the disclosure contains a DNA encoding a suicide gene having at least one intron sequence. The intron sequence has a donor sequence or an acceptor sequence to be used in a tumor cell with abnormal splicing not in a normal cell. In a transcript of the DNA, the suicide gene is expressed when the intron is abnormally spliced and the suicide gene is not expressed when the intron is not abnormally spliced.

13 Claims, 6 Drawing Sheets

Specification includes a Sequence Listing.

SEQUENCE LISTING

```
<160> NUMBER OF SEQ ID NOS: 20

<210> SEQ ID NO 1
<211> LENGTH: 120
<212> TYPE: DNA
<213> ORGANISM: Artificial Sequence
<220> FEATURE:
<223> OTHER INFORMATION: recombinant

<400> SEQUENCE: 1
gtgagtgact tttggccctt ggtccctcac ctatgaattc tcattcctac ttctcaatat     60
gatcttcatt cttcgacctc tgccatgatc ctgactccct aacccccaagc tcaatttcag    120

<210> SEQ ID NO 2
<211> LENGTH: 135
<212> TYPE: DNA
<213> ORGANISM: Artificial Sequence
<220> FEATURE:
<223> OTHER INFORMATION: recombinant

<400> SEQUENCE: 2
gtgagaaact cgggggggcca gggggtgtcc tcgctgcctt atttcgcccc actccggact     60
tagccggggt gggggcagtt agtgcctggg gggcgcggcc caactcaacc ccttacccca    120
ggccttgccc actag                                                      135

<210> SEQ ID NO 3
<211> LENGTH: 97
<212> TYPE: DNA
<213> ORGANISM: Artificial Sequence
<220> FEATURE:
<223> OTHER INFORMATION: recombinant

<400> SEQUENCE: 3
gtgagtgtca ttagacctgt ctttatctag tggattcaca ttgtgtcttt tgttatatgc     60
aataaagttc tttttagttt gtgcctttct ttcgcag                              97

<210> SEQ ID NO 4
<211> LENGTH: 121
<212> TYPE: DNA
<213> ORGANISM: Artificial Sequence
<220> FEATURE:
<223> OTHER INFORMATION: recombinant
```

<400> SEQUENCE: 4
gtgagttgta acaggcactt tcccacagca cctggtgaac tagattttc ccacaagata    60 cagctttgca gggctatttc aaaatatgtc aaagggatat attttgagat aaaatactca   120
g                                                                  121

<210> SEQ ID NO 5
<211> LENGTH: 121
<212> TYPE: DNA
<213> ORGANISM: Artificial Sequence
<220> FEATURE:
<223> OTHER INFORMATION: recombinant

<400> SEQUENCE: 5
gtgcgagtat ttggggatta ttcttatttt ctgccacttt taacttttag cgtagcttgc    60
aggttggaca cacttctttc tgactgctgg agagctgtgc ttttaactac ctctgatcca   120
g                                                                  121

<210> SEQ ID NO 6
<211> LENGTH: 29
<212> TYPE: DNA
<213> ORGANISM: Artificial Sequence
<220> FEATURE:
<223> OTHER INFORMATION: recombinant

<400> SEQUENCE: 6
tgactcccta accccaagct caatttcag                                     29

<210> SEQ ID NO 7
<211> LENGTH: 31
<212> TYPE: DNA
<213> ORGANISM: Artificial Sequence
<220> FEATURE:
<223> OTHER INFORMATION: recombinant

<400> SEQUENCE: 7
tcaacccctt accccaggcc ttgcccacta g                                  31

<210> SEQ ID NO 8
<211> LENGTH: 44
<212> TYPE: DNA
<213> ORGANISM: Artificial Sequence
<220> FEATURE:
<223> OTHER INFORMATION: recombinant

<400> SEQUENCE: 8
tatatgcaat aaagttcttt ttagtttgtg cctttctttc gcag                    44

<210> SEQ ID NO 9
<211> LENGTH: 17
<212> TYPE: DNA
<213> ORGANISM: Artificial Sequence
<220> FEATURE:
<223> OTHER INFORMATION: recombinant

<400> SEQUENCE: 9
tgagataaaa tactcag                                                  17

<210> SEQ ID NO 10
<211> LENGTH: 18
<212> TYPE: DNA
<213> ORGANISM: Artificial Sequence
<220> FEATURE:

<223> OTHER INFORMATION: recombinant

<400> SEQUENCE: 10
taactacctc tgatccag                                                      18

<210> SEQ ID NO 11
<211> LENGTH: 2449
<212> TYPE: DNA
<213> ORGANISM: Artificial Sequence
<220> FEATURE:
<223> OTHER INFORMATION: recombinant

<400> SEQUENCE: 11

| | | |
|---|---|---|
| ccgataaaat aaagattttt atttagtctc cagaaaaagg ggggaatgaa agaccccacc | 60 |
| tgtaggtttg gcaagctagc tgcagtaacg ccattttgca aggcatggaa aataccaaa | 120 |
| ccaagaatag agaagttcag atcaagggcg ggtacatgaa aatagctaac gttgggccaa | 180 |
| acaggatatc tgcggtgagc agtttcggcc ccggcccggg gccaagaaca gatggtcacc | 240 |
| gcagtttcgg ccccggcccg aggccaagaa cagatggtcc ccagatatgg cccaaccctc | 300 |
| agcagtttct taagacccat cagatgtttc caggctcccc caaggacctg aaatgaccct | 360 |
| gcgccttatt tgaattaacc aatcagcctg cttctcgctt ctgttcgcgc gcttctgctt | 420 |
| cccgagctct ataaaagagc tcacaacccc tcactcggcg cgccagtcct ccgacagact | 480 |
| gagtcgcccg ggggggatct ggagctctcg agaattctca cgcgtgccgc caccatggca | 540 |
| tcttacccgt gccaccaaca tgcgagcgct ttcgatcagg ccgcacgatc caggggccac | 600 |
| tcaaaccggc gaactgcatt gcgacccccgc agacaacagg aggctaccga agtacggctt | 660 |
| gaacagaaga tgcctacatt gctcagagtc tatatagatg gcccgcacgg tatggggaaa | 720 |
| acaacgacta cacagttgtt ggtcgcactc ggctcccgag acgatattgt ttatgtccct | 780 |
| gaacccatga cttattggca agtgctcggc gcttcagaga cgattgcgaa tatatacacg | 840 |
| acgcagcatc ggctcgatca aggggaaatc tcagccggag acgcagctgt agtaatgacc | 900 |
| agcgctcaaa ttaccatggg catgccgtat gcggtaacag atgctgttct ggctcctcac | 960 |
| atcggtgggg aggcaggatc cagtcacgcg ccccccgcctg ccttgacatt gattttgat | 1020 |
| cggcatccaa tagctgcgtt gctttgctac cccgcagcta ggtatctcat ggggagtatg | 1080 |
| accccccaag cggttctggc tttcgtggcg ctgataccac ctactctccc tgggactaat | 1140 |
| atagttcttg gcgcactccc tgaagacagg catatagacc gacttgctaa gcgccagagg | 1200 |
| cctggcgaaa gacttgatct tgcgatgttg gcggccatca ggcgcgttta cgggctgctc | 1260 |
| gcaaacaccg taaggtacct ccaaggggc ggatcatgga gggaggattg gggtcagctg | 1320 |
| tccggaacag caggtgagtt gtaacaggca ctttcccaca gcacctggtg aactagattt | 1380 |
| ttcccacaag atacagcttt gcagggctat ttcaaaatat gtcaaaggga tatatttga | 1440 |
| gataaaatac tcagttcctc cgcagggcgc tgagcctcag agtaatgcgg gcccacgccc | 1500 |
| acacatcgga gataccctct ttactctgtt ccgcgctcct gaacttctcg ccccaaatgg | 1560 |
| tgatctgtat aacgtatttg cctgggcgct cgatgtgctt gcgaagaggc tgcgccctat | 1620 |
| gcatgtgttc atcttggatt acgaccaatc cccggctggc tgtcgagacg cactgttgca | 1680 |
| gctgaccagt gggatggtcc aaactcatgt tacaacaccc ggaagcattc ccacaatttg | 1740 |
| cgatttggca cggactttcg ccagagaaat gggggaagcc aacggaagcg gagctactaa | 1800 |
| cttcagcctg ctgaagcagg ctggagacgt ggaggagaac cctggaccta tgaccgagta | 1860 |
| caagcccacg gtgcgcctcg ccacccgcga cgacgtcccc agggccgtac gcaccctcgc | 1920 |

```
cgccgcgttc gccgactacc ccgccacgcg ccacaccgtc gatccggacc gccacatcga   1980
gcgggtcacc gagctgcaag aactcttcct cacgcgcgtc gggctcgaca tcggcaaggt   2040
gtgggtcgcg gacgacggcg ccgcggtggc ggtctggacc acgccggaga gcgtcgaagc   2100
gggggcggtg ttcgccgaga tcggcccgcg catggccgga ttgagcggtt ccggctggc    2160 cgcgcagcaa cagatggaag gcctcctggc gccgcaccgg cccaaggagc ccgcgtggtt   2220
cctggccacc gtcggcgtct cgcccgacca ccagggcaag ggtctgggca cgccgtcgt    2280 gctccccgga gtggaggcgg ccgagcgcgc cggggtgccc gccttcctgg agacctccgc   2340
gccccgcaac ctccccttct acgagcggct cggcttcacc gtcaccgccg acgtcgaggt   2400
gcccgaagga ccgcgcacct ggtgcatgac ccgcaagccc ggtgcctaa               2449

<210> SEQ ID NO 12
<211> LENGTH: 2449
<212> TYPE: DNA
<213> ORGANISM: Artificial Sequence
<220> FEATURE:
<223> OTHER INFORMATION: recombinant

<400> SEQUENCE: 12
ccgataaaat aaaagatttt atttagtctc cagaaaaagg ggggaatgaa agaccccacc     60
tgtaggtttg gcaagctagc tgcagtaacg ccattttgca aggcatggaa aaataccaaa   120
ccaagaatag agaagttcag atcaagggcg ggtacatgaa aatagctaac gttgggccaa   180
acaggatatc tgcggtgagc agtttcggcc ccggcccggg gccaagaaca gatggtcacc   240
gcagtttcgg ccccggcccg aggccaagaa cagatggtcc ccagatatgg cccaaccctc   300
agcagtttct taagacccat cagatgtttc caggctcccc caaggacctg aaatgaccct   360
gcgccttatt tgaattaacc aatcagcctg cttctcgctt ctgttcgcgc gcttctgctt   420
cccgagctct ataaaagagc tcacaacccc tcactcggcg cgccagtcct ccgacagact   480
gagtcgcccg gggggatct ggagctctcg agaattctca cgcgtgccgc caccatggca    540
tcttacccgt gccaccaaca tgcgagcgct ttcgatcagg ccgcacgatc caggggccac   600
tcaaaccggc gaactgcatt gcgaccccgc agacaacagg aggctaccga agtacggctt   660
gaacagaaga tgcctacatt gctcagagtc tatatagatg gcccgcacgg tatggggaaa   720
acaacgacta cacagttgtt ggtcgcactc ggctcccgag acgatattgt ttatgtccct   780
gaacccatga cttattggca agtgctcggc ggtgcgagta tttggggatt attcttattt   840
tctgccactt ttaactttta gcgtagcttg caggttggac acacttcttt ctgactgctg   900
gagagctgtg cttttaacta cctctgatcc agcttctgag acgattgcga atatatacac   960
gacgcagcat cggctcgatc aaggggaaat ctcagccgga gacgcagctg tagtaatgac  1020
cagcgctcaa attaccatgg gcatgccgta tgcggtaaca gatgctgttc tggctcctca  1080
catcggtggg gaggcaggat ccagtcacgc gcccccgcct gccttgacat tgattttga    1140 tcggcatcca atagctgcgt tgctttgcta ccccgcagct aggtatctca tggggagtat   1200
gaccccccaa gcggttctgg ctttcgtggc gctgatacca cctactctcc ctgggactaa   1260
tatagttctt ggcgcactcc ctgaagacag gcatatagac cgacttgcta agcgccagag   1320
gcctggcgaa agacttgatc ttgcgatgtt ggcggccatc aggcgcgttt acgggctgct   1380
cgcaaacacc gtaaggtacc tccaaggggg cggatcatgg agggaggatt gggtcagct    1440 gtccggaaca gcagtccctc cgcagggcgc tgagcctcag agtaatgcgg gcccacgccc   1500
```

```
acacatcgga gatacccctct ttactctgtt ccgcgctcct gaacttctcg ccccaaatgg    1560
tgatctgtat aacgtatttg cctgggcgct cgatgtgctt gcgaagaggc tgcgccctat    1620
gcatgtgttc atcttggatt acgaccaatc cccggctggc tgtcgagacg cactgttgca    1680
gctgaccagt gggatggtcc aaactcatgt tacaacaccc ggaagcattc ccacaatttg    1740
cgatttggca cggactttcg ccagagaaat gggggaagcc aacggaagcg gagctactaa    1800
cttcagcctg ctgaagcagg ctggagacgt ggaggagaac cctggaccta tgaccgagta    1860
caagcccacg gtgcgcctcg ccacccgcga cgacgtcccc agggccgtac gcaccctcgc    1920
cgccgcgttc gccgactacc ccgccacgcg ccacaccgtc gatccggacc gccacatcga    1980
gcgggtcacc gagctgcaag aactcttcct cacgcgcgtc gggctcgaca tcggcaaggt    2040
gtgggtcgcg gacgacggcg ccgcggtggc ggtctggacc acgccggaga gcgtcgaagc    2100
gggggcggtg ttcgccgaga tcggcccgcg catggccgag ttgagcggtt cccggctggc    2160
cgcgcagcaa cagatggaag gcctcctggc gccgcaccgg cccaaggagc ccgcgtggtt    2220 cctgccacc gtcggcgtct cgcccgacca ccagggcaag ggtctgggca gcgccgtcgt    2280
gctccccgga gtggaggcgg ccgagcgcgc cggggtgccc gccttcctgg agacctccgc    2340
gccccgcaac ctccccttct acgagcggct cggcttcacc gtcaccgccg acgtcgaggt    2400
gcccgaagga ccgcgcacct ggtgcatgac ccgcaagccc ggtgcctaa                2449

<210> SEQ ID NO 13
<211> LENGTH: 2449
<212> TYPE: DNA
<213> ORGANISM: Artificial Sequence
<220> FEATURE:
<223> OTHER INFORMATION: recombinant

<400> SEQUENCE: 13
ccgataaaat aaaagatttt atttagtctc cagaaaaagg ggggaatgaa agaccccacc      60
tgtaggtttg gcaagctagc tgcagtaacg ccattttgca aggcatggaa aaataccaaa     120
ccaagaatag agaagttcag atcaagggcg ggtacatgaa aatagctaac gttgggccaa     180
acaggatatc tgcggtgagc agtttcggcc ccggccgggg gccaagaaca gatggtcacc     240
gcagtttcgg ccccggcccg aggccaagaa cagatggtcc ccagatatgg cccaaccctc     300 agcagttttct taagacccat cagatgtttc caggctcccc caaggacctg aaatgaccct     360
gcgccttatt tgaattaacc aatcagcctg cttctcgctt ctgttcgcgc gcttctgctt     420
cccgagctct ataaaagagc tcacaacccc tcactcggcg cgccagtcct ccgacagact     480
gagtcgcccg ggggggatct ggagctctcg agaattctca cgcgtgccgc caccatggca    540
tcttacccgt gccaccaaca tgcgagcgct ttcgatcagg ccgcacgatc caggggccac    600
tcaaaccggc gaactgcatt gcgaccccgc agacaacagg aggctaccga agtacggctt    660
gaacagaaga tgcctacatt gctcaggtga gtgactttg gcccttggtc cctcacctat     720
gaattctcat tcctacttct caatatgatc ttcattcttc gacctctgcc atgatcctga    780
ctccctaacc ccaagctcaa tttcaggagt ctatatagat ggcccgcacg gtatggggaa    840
aacaacgact acacagttgt tggtcgcact cggctcccga gacgatattg tttatgtccc    900
tgaacccatg acttattggc aagtgctcgg cgcttcagag acgattgcga atatatacac    960
gacgcagcat cggctcgatc aaggggaaat ctcagccgga gacgcagctg tagtaatgac   1020
cagcgctcaa attaccatgg gcatgccgta tgcggtaaca gatgctgttc tggctcctca   1080
catcggtggg gaggcaggat ccagtcacgc gccccgcct gccttgacat tgattttttga   1140
```

-continued

```
tcggcatcca atagctgcgt tgctttgcta ccccgcagct aggtatctca tggggagtat    1200
gaccccccaa gcggttctgg ctttcgtggc gctgatacca cctactctcc ctgggactaa    1260
tatagttctt ggcgcactcc ctgaagacag gcatatagac cgacttgcta agcgccagag    1320
gcctggcgaa agacttgatc ttgcgatgtt ggcggccatc aggcgcgttt acgggctgct    1380
cgcaaacacc gtaaggtacc tccaaggggg cggatcatgg agggaggatt ggggtcagct    1440
gtccggaaca gcagtccctc cgcagggcgc tgagcctcag agtaatgcgg gcccacgccc    1500
acacatcgga gataccctct ttactctgtt ccgcgctcct gaacttctcg ccccaaatgg    1560
tgatctgtat aacgtatttg cctgggcgct cgatgtgctt gcgaagaggc tgcgccctat    1620
gcatgtgttc atcttggatt acgaccaatc cccggctggc tgtcgagacg cactgttgca    1680
gctgaccagt gggatggtcc aaactcatgt tacaacaccc ggaagcattc ccacaatttg    1740
cgatttggca cggactttcg ccagagaaat gggggaagcc aacggaagcg gagctactaa    1800
cttcagcctg ctgaagcagg ctggagacgt ggaggagaac cctggaccta tgaccgagta    1860
caagcccacg gtgcgcctcg ccacccgcga cgacgtcccc agggccgtac gcaccctcgc    1920
cgccgcgttc gccgactacc ccgccacgcg ccacaccgtc gatccggacc gccacatcga    1980
gcgggtcacc gagctgcaag aactcttcct cacgcgcgtc gggctcgaca tcggcaaggt    2040
gtgggtcgcg gacgacggcg ccgcggtggc ggtctggacc acgccggaga gcgtcgaagc    2100
gggggcggtg ttcgccgaga tcggcccgcg catggccgag ttgagcggtt cccggctggc    2160
cgcgcagcaa cagatggaag gcctcctggc gccgcaccgg cccaaggagc ccgcgtggtt    2220
cctggccacc gtcggcgtct cgcccgacca ccagggcaag ggtctgggca cgccgtcgt    2280 gctcccgga gtggaggcgg ccgagcgcgc cggggtgccc gccttcctgg agacctccgc    2340
gccccgcaac ctccccttct acgagcggct cggcttcacc gtcaccgccg acgtcgaggt    2400
gcccgaagga ccgcgcacct ggtgcatgac ccgcaagccc ggtgcctaa            2449
```

<210> SEQ ID NO 14
<211> LENGTH: 2464
<212> TYPE: DNA
<213> ORGANISM: Artificial Sequence
<220> FEATURE:
<223> OTHER INFORMATION: recombinant

<400> SEQUENCE: 14

```
ccgataaaat aaaagatttt atttagtctc cagaaaaagg ggggaatgaa agaccccacc      60
tgtaggtttg gcaagctagc tgcagtaacg ccattttgca aggcatggaa aaataccaaa     120
ccaagaatag agaagttcag atcaagggcg ggtacatgaa aatagctaac gttgggccaa     180
acaggatatc tgcggtgagc agtttcggcc ccggcccggg ccaagaaca gatggtcacc      240 gcagtttcgg ccccggcccg aggccaagaa cagatggtcc ccagatatgg cccaaccctc     300
agcagttcct taagacccat cagatgtttc caggctcccc caaggacctg aaatgaccct     360
gcgccttatt tgaattaacc aatcagcctg cttctcgctt ctgttcgcgc gcttctgctt     420
cccgagctct ataaaagagc tcacaacccc tcactcggcg cgccagtcct ccgacagact     480
gagtcgcccg gggggggatct ggagctctcg agaattctca cgcgtgccgc caccatggca   540
tcttacccgt gccaccaaca tgcgagcgct ttcgatcagg ccgcacgatc caggggccac     600
tcaaaccggc gaactgcatt gcgacccgcc agacaacagg aggctaccga agtacgcgtt     660
gaacagaaga tgcctacatt gctcagagtc tatatagatg gcccgcacgg tatggggaaa    720
```

-continued

| | |
|---|---|
| acaacgacta cacagttgtt ggtcgcactc ggctcccgag acgatattgt ttatgtccct | 780 |
| gaacccatga cttattggca agtgctcggc gcttcagaga cgattgcgaa tatatacacg | 840 |
| acgcagcatc ggctcgatca aggggaaatc tcagccggag acgcagctgt agtaatgacc | 900 |
| agcgctcaaa ttaccatggg catgccgtat gcggtaacag atgctgttct ggctcctcac | 960 |
| atcggtgggg aggcaggatc cagtcacgcg ccccgccgg tgagaaactc ggggggccag | 1020 |
| ggggtgtcct cgctgcctta tttcgcccca ctccggactt agccggggtg ggggcagtta | 1080 |
| gtgcctgggg ggcgcggccc aactcaaccc cttaccccag gccttgccca ctagggccct | 1140 |
| tacattgatt tttgatcggc atccaatagc tgcgttgctt tgctaccccg cagctaggta | 1200 |
| tctcatgggg agtatgaccc cccaagcggt tctggctttc gtggcgctga taccacctac | 1260 |
| tctccctggg actaatatag ttcttggcgc actccctgaa acaggcata tagaccgact | 1320 |
| tgctaagcgc cagaggcctg gcgaaagact tgatcttgcg atgttggcgg ccatcaggcg | 1380 |
| cgtttacggg ctgctcgcaa acaccgtaag gtacctccaa gggggcggat catggaggga | 1440 |
| ggattggggt cagctgtccg gaacagcagt ccctccgcag ggcgctgagc ctcagagtaa | 1500 |
| tgcgggccca cgcccacaca tcggagatac cctctttact ctgttccgcg ctcctgaact | 1560 |
| tctcgcccca aatggtgatc tgtataacgt atttgcctgg gcgctcgatg tgcttgcgaa | 1620 |
| gaggctgcgc cctatgcatg tgttcatctt ggattacgac caatcccgg ctggctgtcg | 1680 |
| agacgcactg ttgcagctga ccagtgggat ggtccaaact catgttacaa cacccggaag | 1740 |
| cattcccaca atttgcgatt tggcacggac tttcgccaga gaaatggggg aagccaacgg | 1800 |
| aagcggagct actaacttca gcctgctgaa gcaggctgga gacgtggagg agaaccctgg | 1860 |
| acctatgacc gagtacaagc ccacggtgcg cctcgccacc cgcgacgacg tccccagggc | 1920 |
| cgtacgcacc ctcgccgccg cgttcgccga ctaccccgcc acgcgccaca ccgtcgatcc | 1980 |
| ggaccgccac atcgagcggg tcaccgagct gcaagaactc ttcctcacgc gcgtcgggct | 2040 |
| cgacatcggc aaggtgtggg tcgcggacga cggcgccgcg gtggcggtct ggaccacgcc | 2100 |
| ggagagcgtc gaagcggggg cggtgttcgc cgagatcggc ccgcgcatgg ccgagttgag | 2160 |
| cggttcccgg ctggccgcgc agcaacagat ggaaggcctc ctggcgccgc accggcccaa | 2220 |
| ggagcccgcg tggttcctgg ccaccgtcgg cgtctcgccc gaccaccagg gcaagggtct | 2280 |
| gggcagcgcc gtcgtgctcc ccggagtgga ggcggccgag cgcgccgggg tgcccgcctt | 2340 |
| cctggagacc tccgcgcccc gcaacctccc cttctacgag cggctcggct tcaccgtcac | 2400 |
| cgccgacgtc gaggtgcccg aaggaccgcg cacctggtgc atgacccgca agcccggtgc | 2460 |
| ctaa | 2464 |

<210> SEQ ID NO 15
<211> LENGTH: 2426
<212> TYPE: DNA
<213> ORGANISM: Artificial Sequence
<220> FEATURE:
<223> OTHER INFORMATION: recombinant

<400> SEQUENCE: 15

| | |
|---|---|
| ccgataaaat aaaagatttt atttagtctc cagaaaaagg ggggaatgaa agaccccacc | 60 |
| tgtaggtttg gcaagctagc tgcagtaacg ccattttgca aggcatggaa aataccaaa | 120 |
| ccaagaatag agaagttcag atcaagggcg ggtacatgaa aatagctaac gttgggccaa | 180 |
| acaggatatc tgcggtgagc agtttcggcc ccggcccggg gccaagaaca gatggtcacc | 240 |
| gcagtttcgg ccccggcccg aggccaagaa cagatggtcc ccagatatgg cccaaccctc | 300 |

```
agcagtttct taagacccat cagatgtttc caggctcccc caaggacctg aaatgaccct    360
gcgccttatt tgaattaacc aatcagcctg cttctcgctt ctgttcgcgc gcttctgctt    420
cccgagctct ataaaagagc tcacaacccc tcactcggcg cgccagtcct ccgacagact    480
gagtcgcccg gggggatct ggagctctcg agaattctca cgcgtgccgc caccatggca    540
tcttacccgt gccaccaaca tgcgagcgct ttcgatcagg ccgcacgatc caggggccac    600
tcaaaccggc gaactgcatt gcgaccccgc agacaacagg aggctaccga agtacggctt    660
gaacagaaga tgcctacatt ggtgagtgtc attagacctg tctttatcta gtggattcac    720
attgtgtctt ttgttatatg caataaagtt cttttagtt tgtgcctttc tttcgcaggc    780
tccgcgtcta tatagatggc ccgcacggta tggggaaaac aacgactaca cagttgttgg    840
tcgcactcgg ctcccgagac gatattgttt atgtccctga acccatgact tattggcaag    900
tgctcggcgc ttcagagacg attgcgaata tatacacgac gcagcatcgg ctcgatcaag    960
gggaaatctc agccggagac gcagctgtag taatgaccag cgctcaaatt accatgggca   1020
tgccgtatgc ggtaacagat gctgttctgg ctcctcacat cggtggggag gcaggatcca   1080
gtcacgcgcc cccgcctgcc ttgacattga ttttgatcg gcatccaata gctgcgttgc    1140
tttgctaccc cgcagctagg tatctcatgg ggagtatgac cccccaagcg gttctggctt   1200
tcgtggcgct gataccacct actctccctg gactaatat agttcttggc gcactccctg    1260
aagacaggca tatagaccga cttgctaagc gccagaggcc tggcgaaaga cttgatcttg   1320
cgatgttggc ggccatcagg cgcgtttacg ggctgctcgc aaacaccgta aggtacctcc   1380
aaggggggcgg atcatggagg gaggattggg gtcagctgtc cggaacagca gtccctccgc   1440
agggcgctga gcctcagagt aatgcgggcc acgcccaca catcggagat accctcttta   1500
ctctgttccg cgctcctgaa cttctcgccc caaatggtga tctgtataac gtatttgcct   1560
gggcgctcga tgtgcttgcg aagaggctgc gccctatgca tgtgttcatc ttggattacg   1620
accaatcccc ggctggctgt cgagacgcac tgttgcagct gaccagtggg atggtccaaa   1680
ctcatgttac aacacccgga agcattccca caatttgcga tttggcacgg actttcgcca   1740
gagaaatggg ggaagccaac ggaagcggag ctactaactt cagcctgctg aagcaggctg   1800
gagacgtgga ggagaaccct ggacctatga ccgagtacaa gcccacggtg cgcctcgcca   1860
cccgcgacga cgtccccagg gccgtacgca ccctcgccgc cgcgttcgcc gactaccccg   1920
ccacgcgcca caccgtcgat ccggaccgcc acatcgagcg ggtcaccgag ctgcaagaac   1980
tcttcctcac gcgcgtcggg ctcgacatcg gcaaggtgtg ggtcgcggac gacggcgcca   2040
cggtggcggt ctggaccacg ccggagagcg tcgaagcggg ggcggtgttc gccgagatcg   2100
gcccgcgcat ggccgagttg agcggttccc ggctggccgc gcagcaacag atggaaggcc   2160
tcctggcgcc gcaccggccc aaggagcccg cgtggttcct ggccaccgtc ggcgtctcgc   2220
ccgaccacca gggcaagggt ctgggcagcg ccgtcgtgct ccccgagtg gaggcggcca   2280
agcgcgccgg ggtgcccgcc ttcctggaga cctccgcgcc ccgcaacctc cccttctacg   2340
agcggctcgg cttcaccgtc accgccgacg tcgaggtgcc cgaaggaccg cgcacctggt   2400
gcatgacccg caagcccggt gcctaa                                        2426
```

<210> SEQ ID NO 16
<211> LENGTH: 2328
<212> TYPE: DNA
<213> ORGANISM: Artificial Sequence
<220> FEATURE:

<223> OTHER INFORMATION: recombinant

<400> SEQUENCE: 16

```
ccgataaaat aaagattttt atttagtctc cagaaaaagg ggggaatgaa agaccccacc      60
tgtaggtttg gcaagctagc tgcagtaacg ccattttgca aggcatggaa aaataccaaa     120
ccaagaatag agaagttcag atcaagggcg ggtacatgaa aatagctaac gttgggccaa     180
acaggatatc tgcggtgagc agtttcggcc ccggcccggg gccaagaaca gatggtcacc     240
gcagtttcgg ccccggcccg aggccaagaa cagatggtcc ccagatatgg cccaaccctc     300
agcagtttct taagacccat cagatgtttc caggctcccc aaggacctg aaatgaccct      360
gcgccttatt tgaattaacc aatcagcctg cttctcgctt ctgttcgcgc gcttctgctt     420
cccgagctct ataaaagagc tcacaacccc tcactcggcg cgccagtcct ccgacagact     480
gagtcgcccg ggggggatct ggagctctcg agaattctca cgcgtgccgc caccatggca     540
tcttacccgt gccaccaaca tgcgagcgct ttcgatcagg ccgcacgatc caggggccac     600
tcaaaccggc gaactgcatt gcgaccccgc agacaacagg aggctaccga agtacggctt     660
gaacagaaga tgcctacatt gctcagagtc tatatagatg cccgcacgg tatggggaaa      720
acaacgacta cacagttgtt ggtcgcactc ggctcccgag acgatattgt ttatgtccct     780
gaacccatga cttattggca agtgctcggc gcttcagaga cgattgcgaa tatatacacg     840
acgcagcatc ggctcgatca aggggaaatc tcagccggag acgcagctgt agtaatgacc     900
agcgctcaaa ttaccatggg catgccgtat gcggtaacag atgctgttct ggctcctcac     960
atcggtgggg aggcaggatc cagtcacgcg ccccgcctg ccttgacatt gattttgat     1020
cggcatccaa tagctgcgtt gctttgctac cccgcagcta ggtatctcat ggggagtatg    1080
acccccccaag cggttctggc tttcgtggcg ctgataccac ctactctccc tgggactaat    1140
atagttcttg gcgcactccc tgaagacagg catatagacc gacttgctaa gcgccagagg    1200
cctggcgaaa gacttgatct tgcgatgttg gcggccatca ggcgcgttta cgggctgctc    1260
gcaaacaccg taaggtacct ccaaggggc ggatcatgga gggaggattg gggtcagctg     1320
tccggaacag cagtccctcc gcagggcgct gagcctcaga gtaatgcggg cccacgccca    1380
cacatcggag ataccctctt tactctgttc cgcgctcctg aacttctcgc cccaaatggt    1440
gatctgtata acgtatttgc ctgggcgctc gatgtgcttg cgaagaggct gcgcccctatg   1500
catgtgttca tcttggatta cgaccaatcc ccggctggct gtcgagacgc actgttgcag    1560
ctgaccagtg ggatggtcca aactcatgtt acaacacccg gaagcattcc cacaatttgc    1620
gatttggcac ggactttcgc cagagaaatg ggggaagcca acggaagcgg agctactaac    1680
ttcagcctgc tgaagcaggc tggagacgtg gaggagaacc ctggacctat gaccgagtac    1740
aagcccacgg tgcgcctcgc cacccgcgac gacgtcccca gggccgtacg caccctcgcc    1800
gccgcgttcg ccgactaccc cgccacgcgc cacaccgtcg atccggaccg ccacatcgag    1860
cgggtcaccg agctgcaaga actcttcctc acgcgcgtcg ggctcgacat cggcaaggtg    1920
tgggtcgcgg acgacggcgc cgcggtggcg gtctggacca cgccggagag cgtcgaagcg    1980
ggggcggtgt cgccgagat cggcccgcgc atggccgagt tgagcggttc ccggctggcc    2040
gcgcagcaac agatggaagg cctcctggcg ccgcaccggc ccaaggagcc cgcgtggttc    2100
ctggccaccg tcggcgtctc gcccgaccac cagggcaagg gtctgggcag cgccgtcgtg    2160
ctcccccgga gtggaggcgg cgagcgcgcc ggggtgcccg ccttcctgga gacctccgcg    2220
```

-continued

| cccgcaacc tccccttcta cgagcggctc ggcttcaccg tcaccgccga cgtcgaggtg | 2280 |
| cccgaaggac cgcgcacctg gtgcatgacc cgcaagcccg gtgcctaa | 2328 |

<210> SEQ ID NO 17
<211> LENGTH: 3945
<212> TYPE: DNA
<213> ORGANISM: Artificial Sequence
<220> FEATURE:
<223> OTHER INFORMATION: recombinant

<400> SEQUENCE: 17

| atggactaca aagatgacga cgacaagtct agagccaaaa tcgccaagac tcatgaggac | 60 |
| atagaggcgc agattaggga aatccaggga agaaggccg cactggatga ggctcaaggc | 120 |
| gttggtctgg actctacggg atactatgat caggagatat atggaggatc cgatagccgc | 180 |
| tttgcaggat atgtaacaag catcgccgcc actgagctgg aggatgatga tgatgattat | 240 |
| agtagctcaa cgagccttt ggggcagaaa aaaccaggct atcacgcgcc tgtcgcactg | 300 |
| cttaacgaca ttccgcaatc cactgaacag tacgatccgt tcgcggaaca ccggccaccg | 360 |
| aaaattgcag accgggagga cgagtataaa agcatagac gaacgatgat aatcagtccc | 420 |
| gaacgacttg atccttttgc ggatggcggt aaaacgccgg atcccaagat gaatgcgcga | 480 |
| acgtacatgg acgtgatgcg cgagcagcac ttgacgaaag aggagagaga atacgacaa | 540 |
| cagctggccg aaaaagctaa agctggggaa ctcaaagtcg tgaacggcgc ggcagcgtca | 600 |
| cagccaccta gtaagcgaaa gaggaggtgg gatcaaacgg ccgatcaaac ccccggcgcg | 660 |
| acgcctaaga aattgtcatc ttgggaccag gccgagacgc ctggacatac gccctcactt | 720 |
| agatgggacg aaaccccagg cagagctaag ggctcagaaa cgccaggtgc tactcccgga | 780 |
| tctaaaatct gggacccaac gccaagtcac acgcccgcag gcgcagctac accagggaga | 840 |
| ggtgacaccc cggccacgc tacgccagga cacggcggtg ctacatcttc cgcgcggaag | 900 |
| aatcggtggg acgaaacgcc caagacagag cgcgatacc ccgggcacgg gtctggctgg | 960 |
| gccgaaacgc caagaacgga cagaggtggc gactctatcg gcgagacacc cactcctggc | 1020 |
| gctagcaaac ggaaatccag atgggatgag acgccggcaa gccagatggg ggggtccact | 1080 |
| ccagtattga cccccggcaa aacgccgatc ggcaccccg cgatgaatat ggctacgccg | 1140 |
| actcctggac atattatgtc aatgacgccc aacagctcc aagcttggcg gtgggagcgg | 1200 |
| gaaatcgatg aacgaaatcg cccgcttcc gatgaggaat tggatgccat gtttccagaa | 1260 |
| ggatataaag ttctcccgcc gccagctggt tacgtacca tcaggacacc agcgcgcaaa | 1320 |
| ctcacggcta cacctacgcc attgggggga tgactggtt ccacatgca gacagaggac | 1380 |
| cgaaccatga gagtgtaaa tgaccagcca tctgggaacc ttccttcct caaacccgat | 1440 |
| gacatccagt actttgataa gttgctggtc gacgtcgatg aaagtacatt gtccccagag | 1500 |
| gaacagaagg aacgcaagat tatgaagctt ttgcttaaga ttaagaatgg caccccccct | 1560 |
| atgagaaagg ccgctctgag acaaatcacc gataaggccc gcgaatttgg tgccgggccg | 1620 |
| ctgttcaatc agatactccc cctgctcatg tccccaaccc tggaggatca agagcggcac | 1680 |
| ctgctggtaa aagtgattga tcggatactc tataagctcg acgacttgt tagaccctac | 1740 |
| gtgcataaga tccttgtggt gatagagccc cttctcattg acgaagacta ctatgcccgg | 1800 |
| gttgaaggaa gagagatcat cagtaatttg gccaaagccg ctggactggc gacgatgatc | 1860 |
| tccacgatgc gcccagacat tgacaatatg gacgaatatg ttcgcaacac tacggcgcgc | 1920 |

```
gcgttcgcgg tcgtagcgtc cgccttgggg atcccatcac tgctgccatt tttgaaagca   1980
gtctgcaaga gtaaaaaaag ttggcaggca cgacatacgg cattaaaat cgtgcaacaa    2040 attgccatcc ttatggttg tgccatcctt ccacacctgc ggagcttggt cgaaattatt    2100
gaacatgggt tggttgatga gcaacaaaaa gttaggacga taagcgccct ggccatagcg   2160
gccttggctg aggcggcgac tccttacggc attgagtcat tcgattcagt cttgaagcct   2220
ttgtggaagg gaatcaggca gcacaggggt aagggcctgg cagctttcct caaggcaata   2280
ggctatttga tacctctgat ggatgctgag tatgctaact actacacgag ggaggtgatg   2340
ttgattctga tccgggagtt ccagtcacct gacgaggaaa tgaagaaaat tgtcctgaag   2400
gttgttaaac aatgttgcgg cactgacggg gtagaggcca actacataaa aacagagata   2460
ttgccaccgt ttttcaaaca ttttttggcaa caccgaatgg ccctggaccg gagaaactat   2520
agacaacttg tggacacgac cgtagagctg gcaaacaagg tgggagccgc agaaataatc   2580
tctcggatcg tcgacgactt gaaagatgaa gctgaacagt atcgaaaaat ggttatggag   2640
actatagaga agatcatggg gaatcttggt gctgcagaca tagaccataa actcgaggag   2700
cagctcatag acggtatact gtatgctttt caggagcaga caacggaaga cagtgtgatg   2760
ctcaatggct ttggaacggt tgtgaatgct ctgggaaaga gggtgaagcc atatctccca   2820
cagatctgcg gcactgtcct gtggagactc aacaataagt ctgcgaaggt gcgacagcaa   2880
gccgcggacc tgattagtcg gacggctgtt gtgatgaaga cttgccagga gaaaagctt    2940 atgggtcatc tggcgtcgt cctttatgaa taccttgggg aagaataccc cgaggtattg    3000
ggttccattt tgggagcact caaggccatt gttaacgtta tcggcatgca caaaatgacc   3060
ccaccaatta aggacctgct gccgagactg acaccaatct tgaagaaccg gcacgaaaaa   3120
gtgcaagaaa actgcataga cctcgtcgga aggatcgccg atagaggcgc ggagtacgtg   3180
tctgctaggg aatggatgag gatatgctt gaattgctgg agctgcttaa agctcacaaa    3240
aaggcaattc gccgagctac agtcaatacg tttggataca ttgccaaagc tatcggcccc   3300
catgacgtct tggcaactct tttgaataac ttgaaagtac aggagcgaca gaatagagtt   3360
tgtacgaccg tcgcgattgc aattgtcgct gagacttgca gccccttta cagttctgcct   3420 gctttgatga atgagtaccg ggttcctgag ttgaatgtgc aaaacggggt gctgaaatcc   3480
ctgtccttcc tctttgaata cataggagag atgggaaaag attacatcta tgcagtaacg   3540
ccgcttctgg aagatgcatt gatggatcgg gatctggtac ataggcagac cgccagtgct   3600
gtagtacagc acatgagcct gggagtctac ggcttcggct gtgaagacag cctcaaccat   3660
ctgcttaatt atgtttggcc taatgtcttc gaaacaagtc cacacgtaat tcaggctgta   3720
atgggagcct ggagggact gcgagtggcg atagggccat gtagaatgct tcaatattgc    3780
cttcagggtc tgttccatcc tgcacgaaaa gtaagagacg tttactggaa aatctacaac   3840
tccatttata ttggatccca agacgctctg atagcgcact atccgcgcat ttacaacgat   3900
gataaaaata cttacatacg gtacgaactc gactatatcc tctaa                    3945
```

<210> SEQ ID NO 18
<211> LENGTH: 3945
<212> TYPE: DNA
<213> ORGANISM: Artificial Sequence
<220> FEATURE:
<223> OTHER INFORMATION: recombinant

<400> SEQUENCE: 18

```
atggactaca aagatgacga cgacaagtct agagccaaaa tcgccaagac tcatgaggac      60
atagaggcgc agattaggga aatccaggga agaaggccg cactggatga ggctcaaggc     120
gttggtctgg actctacggg atactatgat caggagatat atggaggatc cgatagccgc     180
tttgcaggat atgtaacaag catcgccgcc actgagctgg aggatgatga tgatgattat     240
agtagctcaa cgagcctttt ggggcagaaa aaaccaggct atcacgcgcc tgtcgcactg     300
cttaacgaca ttccgcaatc cactgaacag tacgatccgt tcgcggaaca ccggccaccg     360
aaaattgcag accgggagga cgagtataaa agcatagac gaacgatgat aatcagtccc      420
gaacgacttg atccttttgc ggatggcggt aaaacgccgg atcccaagat gaatgcgcga     480
acgtacatgg acgtgatgcg cgagcagcac ttgacgaaag aggagagaga aatacgacaa     540
cagctggccg aaaaagctaa agctggggaa ctcaaagtcg tgaacggcgc ggcagcgtca     600
cagccaccta gtaagcgaaa gaggaggtgg gatcaaacgg ccgatcaaac ccccggcgcg     660
acgcctaaga aattgtcatc ttgggaccag gccgagacgc ctggacatac gccctcactt     720
agatgggacg aaaccccagg cagagctaag ggctcagaaa cgccaggtgc tactcccgga     780
tctaaaatct gggacccaac gccaagtcac acgcccgcag gcgcagctac accagggaga     840
ggtgacaccc cggccacgc tacgccagga cacggcggtg ctacatcttc cgcgcggaag      900
aatcggtggg acgaaacgcc caagacagag cgcgataccc ccgggcacgg gtctggctgg     960
gccgaaacgc caagaacgga cagaggtggc gactctatcg gcgagacacc cactcctggc    1020
gctagcaaac ggaaatccag atgggatgag acgccggcaa gccagatggg ggggtccact    1080
ccagtattga cccccggcaa aacgccgatc ggcacccccg cgatgaatat ggctacgccg    1140
actcctggac atattatgtc aatgacgccc gaacagctcc aagcttggcg gtgggagcgg    1200
gaaatcgatg aacgaaatcg cccgcttcc gatgaggaat tggatgccat gtttccagaa     1260
ggatataaag ttctcccgcc gccagctggt tacgtaccca tcaggacacc agcgcgcaaa    1320
ctcacggcta cacctacgcc attgggggga atgactggtt ccacatgca gacagaggac     1380
cgaaccatga agagtgtaaa tgaccagcca tctgggaacc ttccttcct caaacccgat     1440
gacatccagt actttgataa gttgctggtc gacgtcgatg aaagtacatt gtccccagag    1500
gaacagaagg aacgcaagat tatgaagctt ttgcttaaga ttaagaatgg cacccccct     1560
atgagaaagg ccgctctgag acaaatcacc gataaggccc gcgaatttgg tgccgggccg    1620
ctgttcaatc agatactccc cctgctcatg tccccaaccc tggaggatca agagcggcac    1680
ctgctggtaa aagtgattga tcggatactc tataagctcg acgaccttgt tagaccctac    1740
gtgcataaga tccttgtggt gatagagccc cttctcattg acgaagacta ctatgcccgg    1800
gttgaaggaa gagagatcat cagtaatttg gccaaagccg ctggactggc gacgatgatc    1860
tccacgatgc gcccagacat tgacaatatg gacgaatatg ttcgcaacac tacggcgcgc    1920
gcgttcgcgg tcgtagcgtc cgccttgggg atcccatcac tgctgccatt tttgaaagca    1980
gtctgcaaga gtaaaaaaag ttggcaggca cgacatacgg gcattaaaat cgtgcaacaa    2040
attgccatcc ttatggggtg tgccatcctt ccacacctgc ggagcttggt cgaaattatt    2100
gaacatgggt tggttgatga gcaacaagaa gttaggacga taagcgccct ggccatagcg    2160
gccttggctg aggcggcgac tccttacggc attgagtcat tcgattcagt cttgaagcct    2220
ttgtggaagg gaatcaggca gcacagggt aagggcctgg cagctttcct caaggcaata     2280
```

```
ggctatttga tacctctgat ggatgctgag tatgctaact actacacgag ggaggtgatg    2340
ttgattctga tccgggagtt ccagtcacct gacgaggaaa tgaagaaaat tgtcctgaag    2400
gttgttaaac aatgttgcgg cactgacggg gtagaggcca actacataaa aacagagata    2460
ttgccaccgt ttttcaaaca ttttttggcaa caccgaatgg ccctggaccg gagaaactat    2520
agacaacttg tggacacgac cgtagagctg gcaaacaagg tgggagccgc agaaataatc    2580
tctcggatcg tcgacgactt gaaagatgaa gctgaacagt atcgaaaaat ggttatggag    2640
actatagaga agatcatggg gaatcttggt gctgcagaca tagaccataa actcgaggag    2700
cagctcatag acggtatact gtatgctttt caggagcaga caacggaaga cagtgtgatg    2760
ctcaatggct ttggaacggt tgtgaatgct ctgggaaaga gggtgaagcc atatctccca    2820
cagatctgcg gcactgtcct gtggagactc aacaataagt ctgcgaaggt gcgacagcaa    2880
gccgcggacc tgattagtcg gacggctgtt gtgatgaaga cttgccagga agaaaagctt    2940
atgggtcatc tgggcgtcgt cctttatgaa taccttgggg aagaataccc cgaggtattg    3000
ggttccattt tgggagcact caaggccatt gttaacgtta tcggcatgca caaatgacc    3060 ccaccaatta aggacctgct gccgagactg acaccaatct tgaagaaccg gcacgaaaaa    3120
gtgcaagaaa actgcataga cctcgtcgga aggatcgccg atagaggcgc ggagtacgtg    3180
tctgctaggg aatggatgag gatatgcttt gaattgctgg agctgcttaa agctcacaaa    3240
aaggcaattc gccgagctac agtcaatacg tttggataca ttgccaaagc tatcggcccc    3300
catgacgtct tggcaactct ttttgaataac ttgaaagtac aggagcgaca gaatagagtt    3360
tgtacgaccg tcgcgattgc aattgtcgct gagacttgca gccccttttac agttctgcct    3420 gctttgatga atgagtaccg ggttcctgag ttgaatgtgc aaaacggggt gctgaaatcc    3480
ctgtccttcc tctttgaata cataggagag atgggaaaag attacatcta tgcagtaacg    3540
ccgcttctgg aagatgcatt gatggatcgg gatctggtac ataggcagac cgccagtgct    3600
gtagtacagc acatgagcct gggagtctac ggcttcggct gtgaagacag cctcaaccat    3660
ctgcttaatt atgtttggcc taatgtcttc gaaacaagtc cacacgtaat tcaggctgta    3720
atgggagcct ggagggact gcgagtggcg atagggccat gtagaatgct tcaatattgc    3780
cttcagggtc tgttccatcc tgcacgaaaa gtaagagacg tttactggaa aatctacaac    3840
tccatttata ttggatccca agacgctctg atagcgcact atccgcgcat ttacaacgat    3900
gataaaaata cttacatacg gtacgaactc gactatatcc tctaa                   3945
```

<210> SEQ ID NO 19
<211> LENGTH: 1314
<212> TYPE: PRT
<213> ORGANISM: Artificial Sequence
<220> FEATURE:
<223> OTHER INFORMATION: recombinant

<400> SEQUENCE: 19

```
Met Asp Tyr Lys Asp Asp Asp Asp Lys Ser Arg Ala Lys Ile Ala Lys
1               5                   10                  15

Thr His Glu Asp Ile Glu Ala Gln Ile Arg Glu Ile Gln Gly Lys Lys
            20                  25                  30

Ala Ala Leu Asp Glu Ala Gln Gly Val Gly Leu Asp Ser Thr Gly Tyr
        35                  40                  45

Tyr Asp Gln Glu Ile Tyr Gly Gly Ser Asp Ser Arg Phe Ala Gly Tyr
    50                  55                  60
```

-continued

```
Val Thr Ser Ile Ala Ala Thr Glu Leu Glu Asp Asp Asp Asp Tyr
 65                  70                  75                  80

Ser Ser Ser Thr Ser Leu Leu Gly Gln Lys Pro Gly Tyr His Ala
                 85                  90                  95

Pro Val Ala Leu Leu Asn Asp Ile Pro Gln Ser Thr Glu Gln Tyr Asp
                100                 105                 110

Pro Phe Ala Glu His Arg Pro Lys Ile Ala Asp Arg Glu Asp Glu
            115                 120                 125

Tyr Lys Lys His Arg Arg Thr Met Ile Ile Ser Pro Glu Arg Leu Asp
            130                 135                 140

Pro Phe Ala Asp Gly Gly Lys Thr Pro Asp Pro Lys Met Asn Ala Arg
145                 150                 155                 160

Thr Tyr Met Asp Val Met Arg Glu Gln His Leu Thr Lys Glu Glu Arg
                165                 170                 175

Glu Ile Arg Gln Gln Leu Ala Glu Lys Ala Lys Ala Gly Glu Leu Lys
                180                 185                 190

Val Val Asn Gly Ala Ala Ala Ser Gln Pro Pro Ser Lys Arg Lys Arg
        195                 200                 205

Arg Trp Asp Gln Thr Ala Asp Gln Thr Pro Gly Ala Thr Pro Lys Lys
    210                 215                 220

Leu Ser Ser Trp Asp Gln Ala Glu Thr Pro Gly His Thr Pro Ser Leu
225                 230                 235                 240

Arg Trp Asp Glu Thr Pro Gly Arg Ala Lys Gly Ser Glu Thr Pro Gly
                245                 250                 255

Ala Thr Pro Gly Ser Lys Ile Trp Asp Pro Thr Pro Ser His Thr Pro
                260                 265                 270

Ala Gly Ala Ala Thr Pro Gly Arg Gly Asp Thr Pro Gly His Ala Thr
            275                 280                 285

Pro Gly His Gly Gly Ala Thr Ser Ser Ala Arg Lys Asn Arg Trp Asp
            290                 295                 300

Glu Thr Pro Lys Thr Glu Arg Asp Thr Pro Gly His Gly Ser Gly Trp
305                 310                 315                 320

Ala Glu Thr Pro Arg Thr Asp Arg Gly Gly Asp Ser Ile Gly Glu Thr
                325                 330                 335

Pro Thr Pro Gly Ala Ser Lys Arg Lys Ser Arg Trp Asp Glu Thr Pro
                340                 345                 350

Ala Ser Gln Met Gly Gly Ser Thr Pro Val Leu Thr Pro Gly Lys Thr
            355                 360                 365

Pro Ile Gly Thr Pro Ala Met Asn Met Ala Thr Thr Pro Gly His
    370                 375                 380

Ile Met Ser Met Thr Pro Glu Gln Leu Gln Ala Trp Arg Trp Glu Arg
385                 390                 395                 400

Glu Ile Asp Glu Arg Asn Arg Pro Leu Ser Asp Glu Glu Leu Asp Ala
                405                 410                 415

Met Phe Pro Glu Gly Tyr Lys Val Leu Pro Pro Pro Ala Gly Tyr Val
                420                 425                 430

Pro Ile Arg Thr Pro Ala Arg Lys Leu Thr Ala Thr Pro Thr Pro Leu
            435                 440                 445

Gly Gly Met Thr Gly Phe His Met Gln Thr Glu Asp Arg Thr Met Lys
            450                 455                 460

Ser Val Asn Asp Gln Pro Ser Gly Asn Leu Pro Phe Leu Lys Pro Asp
465                 470                 475                 480
```

```
Asp Ile Gln Tyr Phe Asp Lys Leu Leu Val Asp Val Asp Glu Ser Thr
            485                 490                 495
Leu Ser Pro Glu Glu Gln Lys Glu Arg Lys Ile Met Lys Leu Leu Leu
        500                 505                 510
Lys Ile Lys Asn Gly Thr Pro Pro Met Arg Lys Ala Ala Leu Arg Gln
            515                 520                 525
Ile Thr Asp Lys Ala Arg Glu Phe Gly Ala Gly Pro Leu Phe Asn Gln
        530                 535                 540
Ile Leu Pro Leu Leu Met Ser Pro Thr Leu Glu Asp Gln Glu Arg His
545                 550                 555                 560
Leu Leu Val Lys Val Ile Asp Arg Ile Leu Tyr Lys Leu Asp Asp Leu
                565                 570                 575
Val Arg Pro Tyr Val His Lys Ile Leu Val Val Ile Glu Pro Leu Leu
            580                 585                 590
Ile Asp Glu Asp Tyr Tyr Ala Arg Val Glu Gly Arg Glu Ile Ile Ser
        595                 600                 605
Asn Leu Ala Lys Ala Ala Gly Leu Ala Thr Met Ile Ser Thr Met Arg
        610                 615                 620
Pro Asp Ile Asp Asn Met Asp Glu Tyr Val Arg Asn Thr Thr Ala Arg
625                 630                 635                 640
Ala Phe Ala Val Val Ala Ser Ala Leu Gly Ile Pro Ser Leu Leu Pro
                645                 650                 655
Phe Leu Lys Ala Val Cys Lys Ser Lys Lys Ser Trp Gln Ala Arg His
            660                 665                 670
Thr Gly Ile Lys Ile Val Gln Gln Ile Ala Ile Leu Met Gly Cys Ala
        675                 680                 685
Ile Leu Pro His Leu Arg Ser Leu Val Glu Ile Ile Glu His Gly Leu
        690                 695                 700
Val Asp Glu Gln Gln Lys Val Arg Thr Ile Ser Ala Leu Ala Ile Ala
705                 710                 715                 720
Ala Leu Ala Glu Ala Ala Thr Pro Tyr Gly Ile Glu Ser Phe Asp Ser
                725                 730                 735
Val Leu Lys Pro Leu Trp Lys Gly Ile Arg Gln His Arg Gly Lys Gly
            740                 745                 750
Leu Ala Ala Phe Leu Lys Ala Ile Gly Tyr Leu Ile Pro Leu Met Asp
        755                 760                 765
Ala Glu Tyr Ala Asn Tyr Tyr Thr Arg Glu Val Met Leu Ile Leu Ile
        770                 775                 780
Arg Glu Phe Gln Ser Pro Asp Glu Glu Met Lys Lys Ile Val Leu Lys
785                 790                 795                 800
Val Val Lys Gln Cys Cys Gly Thr Asp Gly Val Glu Ala Asn Tyr Ile
                805                 810                 815
Lys Thr Glu Ile Leu Pro Pro Phe Phe Lys His Phe Trp Gln His Arg
            820                 825                 830
Met Ala Leu Asp Arg Arg Asn Tyr Arg Gln Leu Val Asp Thr Thr Val
        835                 840                 845
Glu Leu Ala Asn Lys Val Gly Ala Ala Glu Ile Ser Arg Ile Val
        850                 855                 860
Asp Asp Leu Lys Asp Glu Ala Glu Gln Tyr Arg Lys Met Val Met Glu
865                 870                 875                 880
Thr Ile Glu Lys Ile Met Gly Asn Leu Gly Ala Ala Asp Ile Asp His
                885                 890                 895
```

-continued

Lys Leu Glu Glu Gln Leu Ile Asp Gly Ile Leu Tyr Ala Phe Gln Glu
              900                 905                 910

Gln Thr Thr Glu Asp Ser Val Met Leu Asn Gly Phe Gly Thr Val Val
          915                 920                 925

Asn Ala Leu Gly Lys Arg Val Lys Pro Tyr Leu Pro Gln Ile Cys Gly
      930                 935                 940

Thr Val Leu Trp Arg Leu Asn Asn Lys Ser Ala Lys Val Arg Gln Gln
945                 950                 955                 960

Ala Ala Asp Leu Ile Ser Arg Thr Ala Val Val Met Lys Thr Cys Gln
              965                 970                 975

Glu Glu Lys Leu Met Gly His Leu Gly Val Val Leu Tyr Glu Tyr Leu
          980                 985                 990

Gly Glu Glu Tyr Pro Glu Val Leu Gly Ser Ile Leu Gly Ala Leu Lys
      995                 1000                1005

Ala Ile Val Asn Val Ile Gly Met His Lys Met Thr Pro Pro Ile
    1010                1015                1020

Lys Asp Leu Leu Pro Arg Leu Thr Pro Ile Leu Lys Asn Arg His
    1025                1030                1035

Glu Lys Val Gln Glu Asn Cys Ile Asp Leu Val Gly Arg Ile Ala
    1040                1045                1050

Asp Arg Gly Ala Glu Tyr Val Ser Ala Arg Glu Trp Met Arg Ile
    1055                1060                1065

Cys Phe Glu Leu Leu Glu Leu Leu Lys Ala His Lys Lys Ala Ile
    1070                1075                1080

Arg Arg Ala Thr Val Asn Thr Phe Gly Tyr Ile Ala Lys Ala Ile
    1085                1090                1095

Gly Pro His Asp Val Leu Ala Thr Leu Leu Asn Asn Leu Lys Val
    1100                1105                1110

Gln Glu Arg Gln Asn Arg Val Cys Thr Thr Val Ala Ile Ala Ile
    1115                1120                1125

Val Ala Glu Thr Cys Ser Pro Phe Thr Val Leu Pro Ala Leu Met
    1130                1135                1140

Asn Glu Tyr Arg Val Pro Glu Leu Asn Val Gln Asn Gly Val Leu
    1145                1150                1155

Lys Ser Leu Ser Phe Leu Phe Glu Tyr Ile Gly Glu Met Gly Lys
    1160                1165                1170

Asp Tyr Ile Tyr Ala Val Thr Pro Leu Leu Glu Asp Ala Leu Met
    1175                1180                1185

Asp Arg Asp Leu Val His Arg Gln Thr Ala Ser Ala Val Val Gln
    1190                1195                1200

His Met Ser Leu Gly Val Tyr Gly Phe Gly Cys Glu Asp Ser Leu
    1205                1210                1215

Asn His Leu Leu Asn Tyr Val Trp Pro Asn Val Phe Glu Thr Ser
    1220                1225                1230

Pro His Val Ile Gln Ala Val Met Gly Ala Leu Glu Gly Leu Arg
    1235                1240                1245

Val Ala Ile Gly Pro Cys Arg Met Leu Gln Tyr Cys Leu Gln Gly
    1250                1255                1260

Leu Phe His Pro Ala Arg Lys Val Arg Asp Val Tyr Trp Lys Ile
    1265                1270                1275

Tyr Asn Ser Ile Tyr Ile Gly Ser Gln Asp Ala Leu Ile Ala His
    1280                1285                1290

```
Tyr Pro Arg Ile Tyr Asn Asp Asp Lys Asn Thr Tyr Ile Arg Tyr
    1295                1300                1305

Glu Leu Asp Tyr Ile Leu
    1310
```

<210> SEQ ID NO 20
<211> LENGTH: 1314
<212> TYPE: PRT
<213> ORGANISM: Artificial Sequence
<220> FEATURE:
<223> OTHER INFORMATION: recombinant

<400> SEQUENCE: 20

```
Met Asp Tyr Lys Asp Asp Asp Lys Ser Arg Ala Lys Ile Ala Lys
1               5                   10                  15

Thr His Glu Asp Ile Glu Ala Gln Ile Arg Glu Ile Gln Gly Lys Lys
            20                  25                  30

Ala Ala Leu Asp Glu Ala Gln Gly Val Gly Leu Asp Ser Thr Gly Tyr
        35                  40                  45

Tyr Asp Gln Glu Ile Tyr Gly Gly Ser Asp Ser Arg Phe Ala Gly Tyr
    50                  55                  60

Val Thr Ser Ile Ala Ala Thr Glu Leu Glu Asp Asp Asp Asp Tyr
65                  70                  75                  80

Ser Ser Ser Thr Ser Leu Leu Gly Gln Lys Lys Pro Gly Tyr His Ala
                85                  90                  95

Pro Val Ala Leu Leu Asn Asp Ile Pro Gln Ser Thr Glu Gln Tyr Asp
            100                 105                 110

Pro Phe Ala Glu His Arg Pro Pro Lys Ile Ala Asp Arg Glu Asp Glu
        115                 120                 125

Tyr Lys Lys His Arg Arg Thr Met Ile Ile Ser Pro Glu Arg Leu Asp
    130                 135                 140

Pro Phe Ala Asp Gly Gly Lys Thr Pro Asp Pro Lys Met Asn Ala Arg
145                 150                 155                 160

Thr Tyr Met Asp Val Met Arg Glu Gln His Leu Thr Lys Glu Glu Arg
                165                 170                 175

Glu Ile Arg Gln Gln Leu Ala Glu Lys Ala Lys Ala Gly Glu Leu Lys
            180                 185                 190

Val Val Asn Gly Ala Ala Ala Ser Gln Pro Pro Ser Lys Arg Lys Arg
        195                 200                 205

Arg Trp Asp Gln Thr Ala Asp Gln Thr Pro Gly Ala Thr Pro Lys Lys
    210                 215                 220

Leu Ser Ser Trp Asp Gln Ala Glu Thr Pro Gly His Thr Pro Ser Leu
225                 230                 235                 240

Arg Trp Asp Glu Thr Pro Gly Arg Ala Lys Gly Ser Glu Thr Pro Gly
                245                 250                 255

Ala Thr Pro Gly Ser Lys Ile Trp Asp Pro Thr Pro Ser His Thr Pro
            260                 265                 270

Ala Gly Ala Ala Thr Pro Gly Arg Gly Asp Thr Pro Gly His Ala Thr
        275                 280                 285

Pro Gly His Gly Gly Ala Thr Ser Ser Ala Arg Lys Asn Arg Trp Asp
    290                 295                 300

Glu Thr Pro Lys Thr Glu Arg Asp Thr Pro Gly His Gly Ser Gly Trp
305                 310                 315                 320

Ala Glu Thr Pro Arg Thr Asp Arg Gly Gly Asp Ser Ile Gly Glu Thr
                325                 330                 335
```

```
Pro Thr Pro Gly Ala Ser Lys Arg Lys Ser Arg Trp Asp Glu Thr Pro
                340                 345                 350
Ala Ser Gln Met Gly Gly Ser Thr Pro Val Leu Thr Pro Gly Lys Thr
            355                 360                 365
Pro Ile Gly Thr Pro Ala Met Asn Met Ala Thr Pro Thr Pro Gly His
        370                 375                 380
Ile Met Ser Met Thr Pro Glu Gln Leu Gln Ala Trp Arg Trp Glu Arg
385                 390                 395                 400
Glu Ile Asp Glu Arg Asn Arg Pro Leu Ser Asp Glu Leu Asp Ala
                405                 410                 415
Met Phe Pro Glu Gly Tyr Lys Val Leu Pro Pro Ala Gly Tyr Val
            420                 425                 430
Pro Ile Arg Thr Pro Ala Arg Lys Leu Thr Ala Thr Pro Thr Pro Leu
        435                 440                 445
Gly Gly Met Thr Gly Phe His Met Gln Thr Glu Asp Arg Thr Met Lys
        450                 455                 460
Ser Val Asn Asp Gln Pro Ser Gly Asn Leu Pro Phe Leu Lys Pro Asp
465                 470                 475                 480
Asp Ile Gln Tyr Phe Asp Lys Leu Leu Val Asp Val Asp Glu Ser Thr
            485                 490                 495
Leu Ser Pro Glu Glu Gln Lys Glu Arg Lys Ile Met Lys Leu Leu Leu
            500                 505                 510
Lys Ile Lys Asn Gly Thr Pro Pro Met Arg Lys Ala Ala Leu Arg Gln
            515                 520                 525
Ile Thr Asp Lys Ala Arg Glu Phe Gly Ala Gly Pro Leu Phe Asn Gln
        530                 535                 540
Ile Leu Pro Leu Leu Met Ser Pro Thr Leu Glu Asp Gln Glu Arg His
545                 550                 555                 560
Leu Leu Val Lys Val Ile Asp Arg Ile Leu Tyr Lys Leu Asp Asp Leu
                565                 570                 575
Val Arg Pro Tyr Val His Lys Ile Leu Val Val Ile Glu Pro Leu Leu
            580                 585                 590
Ile Asp Glu Asp Tyr Tyr Ala Arg Val Glu Gly Arg Glu Ile Ile Ser
            595                 600                 605
Asn Leu Ala Lys Ala Ala Gly Leu Ala Thr Met Ile Ser Thr Met Arg
610                 615                 620
Pro Asp Ile Asp Asn Met Asp Glu Tyr Val Arg Asn Thr Thr Ala Arg
625                 630                 635                 640
Ala Phe Ala Val Val Ala Ser Ala Leu Gly Ile Pro Ser Leu Leu Pro
            645                 650                 655
Phe Leu Lys Ala Val Cys Lys Ser Lys Lys Ser Trp Gln Ala Arg His
                660                 665                 670
Thr Gly Ile Lys Ile Val Gln Gln Ile Ala Ile Leu Met Gly Cys Ala
            675                 680                 685
Ile Leu Pro His Leu Arg Ser Leu Val Glu Ile Ile Glu His Gly Leu
        690                 695                 700
Val Asp Glu Gln Gln Glu Val Arg Thr Ile Ser Ala Leu Ala Ile Ala
705                 710                 715                 720
Ala Leu Ala Glu Ala Ala Thr Pro Tyr Gly Ile Glu Ser Phe Asp Ser
                725                 730                 735
Val Leu Lys Pro Leu Trp Lys Gly Ile Arg Gln His Arg Gly Lys Gly
            740                 745                 750
```

```
Leu Ala Ala Phe Leu Lys Ala Ile Gly Tyr Leu Ile Pro Leu Met Asp
        755                 760                 765
Ala Glu Tyr Ala Asn Tyr Tyr Thr Arg Glu Val Met Leu Ile Leu Ile
770                 775                 780
Arg Glu Phe Gln Ser Pro Asp Glu Glu Met Lys Lys Ile Val Leu Lys
785                 790                 795                 800
Val Val Lys Gln Cys Cys Gly Thr Asp Gly Val Glu Ala Asn Tyr Ile
                    805                 810                 815
Lys Thr Glu Ile Leu Pro Pro Phe Phe Lys His Phe Trp Gln His Arg
                820                 825                 830
Met Ala Leu Asp Arg Arg Asn Tyr Arg Gln Leu Val Asp Thr Thr Val
                    835                 840                 845
Glu Leu Ala Asn Lys Val Gly Ala Ala Glu Ile Ile Ser Arg Ile Val
850                 855                 860
Asp Asp Leu Lys Asp Glu Ala Glu Gln Tyr Arg Lys Met Val Met Glu
865                 870                 875                 880
Thr Ile Glu Lys Ile Met Gly Asn Leu Gly Ala Ala Asp Ile Asp His
                        885                 890                 895
Lys Leu Glu Glu Gln Leu Ile Asp Gly Ile Leu Tyr Ala Phe Gln Glu
                    900                 905                 910
Gln Thr Thr Glu Asp Ser Val Met Leu Asn Gly Phe Gly Thr Val Val
                915                 920                 925
Asn Ala Leu Gly Lys Arg Val Lys Pro Tyr Leu Pro Gln Ile Cys Gly
930                 935                 940
Thr Val Leu Trp Arg Leu Asn Asn Lys Ser Lys Val Arg Gln Gln
945                 950                 955                 960
Ala Ala Asp Leu Ile Ser Arg Thr Ala Val Val Met Lys Thr Cys Gln
                    965                 970                 975
Glu Glu Lys Leu Met Gly His Leu Gly Val Val Leu Tyr Glu Tyr Leu
                980                 985                 990
Gly Glu Glu Tyr Pro Glu Val Leu  Gly Ser Ile Leu Gly  Ala Leu Lys
                995                 1000                1005
Ala Ile  Val Asn Val Ile Gly  Met His Lys Met Thr  Pro Pro Ile
    1010                1015                1020
Lys Asp  Leu Leu Pro Arg Leu  Thr Pro Ile Leu Lys  Asn Arg His
    1025                1030                1035
Glu Lys  Val Gln Glu Asn Cys  Ile Asp Leu Val Gly  Arg Ile Ala
    1040                1045                1050
Asp Arg  Gly Ala Glu Tyr Val  Ser Ala Arg Glu Trp  Met Arg Ile
    1055                1060                1065
Cys Phe  Glu Leu Leu Glu Leu  Leu Lys Ala His Lys  Lys Ala Ile
    1070                1075                1080
Arg Arg  Ala Thr Val Asn Thr  Phe Gly Tyr Ile Ala  Lys Ala Ile
    1085                1090                1095
Gly Pro  His Asp Val Leu Ala  Thr Leu Leu Asn Asn  Leu Lys Val
    1100                1105                1110
Gln Glu  Arg Gln Asn Arg Val  Cys Thr Thr Val Ala  Ile Ala Ile
    1115                1120                1125
Val Ala  Glu Thr Cys Ser Pro  Phe Thr Val Leu Pro  Ala Leu Met
    1130                1135                1140
Asn Glu  Tyr Arg Val Pro Glu  Leu Asn Val Gln Asn  Gly Val Leu
    1145                1150                1155
```

-continued

```
Lys Ser Leu Ser Phe Leu Phe Glu Tyr Ile Gly Glu Met Gly Lys
    1160            1165                1170

Asp Tyr Ile Tyr Ala Val Thr Pro Leu Leu Glu Asp Ala Leu Met
    1175            1180                1185

Asp Arg Asp Leu Val His Arg Gln Thr Ala Ser Ala Val Val Gln
    1190            1195                1200

His Met Ser Leu Gly Val Tyr Gly Phe Gly Cys Glu Asp Ser Leu
    1205            1210                1215

Asn His Leu Leu Asn Tyr Val Trp Pro Asn Val Phe Glu Thr Ser
    1220            1225                1230

Pro His Val Ile Gln Ala Val Met Gly Ala Leu Glu Gly Leu Arg
    1235            1240                1245

Val Ala Ile Gly Pro Cys Arg Met Leu Gln Tyr Cys Leu Gln Gly
    1250            1255                1260

Leu Phe His Pro Ala Arg Lys Val Arg Asp Val Tyr Trp Lys Ile
    1265            1270                1275

Tyr Asn Ser Ile Tyr Ile Gly Ser Gln Asp Ala Leu Ile Ala His
    1280            1285                1290

Tyr Pro Arg Ile Tyr Asn Asp Asp Lys Asn Thr Tyr Ile Arg Tyr
    1295            1300                1305

Glu Leu Asp Tyr Ile Leu
    1310
```

DNA, EXPRESSION VECTOR, TRANSCRIPT, CELL, PHARMACEUTICAL COMPOSITION, AND MEDICINE

BACKGROUND OF THE INVENTION

1. Field of the Invention

The present invention relates to a DNA, an expression vector, a transcript, a cell, a pharmaceutical composition, and a medicine.

2. Description of the Related Art

It has been reported that as a cause of tumorigenesis, in myelodysplastic syndrome (MDS), myeloid leukemia, lymphocytic leukemia, and uveal melanoma, mutations are often observed in specific amino acids such as SF3B1, SRSF2, U2AF35, and ZRSR2, which are spliceosome constituents (Kenichi Yoshida et al., Nature 2011). Accordingly, a splice donor sequence or a splice acceptor sequence that does not function in normal cells is used for abnormal splicing. This abnormal splicing induces abnormal protein expression or inhibition of normal protein expression, resulting in oncogenic transformation of cells (H Dolatshad et al., Leukemia, 2016; Daichi Inoue et al., Nature, 2019; and Lili Wang et al., Cancer Cell, 2016).

SUMMARY OF THE INVENTION

An object of the invention is to provide a novel DNA, expression vector, transcript, cell, pharmaceutical composition, and medicine.

An aspect of the invention relates to a DNA encoding a suicide gene having at least one intron sequence. The intron sequence has a donor sequence or an acceptor sequence to be used in abnormal splicing that occurs in a tumor cell and does not occur in a normal cell. In a transcript of the DNA, the suicide gene is expressed when the intron is abnormally spliced, and the suicide gene is not expressed when the intron is not abnormally spliced. The intron sequence may include a sequence selected from introns of genes encoding at least one protein selected from the group consisting of DYNLL1, HINT2, MAP3K7, TMEM14C, and BRD9. The suicide gene may encode a cell death-inducing protein, a cell division-inhibiting protein, or a protein that converts a precursor of a cell death-inducing compound or a cell division-inhibiting compound into the cell death-inducing compound or the cell division-inhibiting compound. The suicide gene may be a gene encoding a protein selected from the group consisting of a herpes simplex virus type 1 thymidine kinase (HSV-TK), a cytosine deaminase (CD), an inducible caspase 9 (iCasp9), a streptolysin O, and a diphtheria toxin. The suicide gene may not be expressed due to a frame shift when normal splicing occurs. The intron sequence may have a branch point.

Another aspect of the invention relates to an expression vector containing any of the above-mentioned DNAs. The expression vector may contain a promoter that specifically controls transcription of the suicide gene in the tumor cell, a promoter that controls transcription in an eukaryotic cell, a promoter that specifically controls transcription in a hematopoietic stem cell or a melanocyte.

A still another aspect of the invention relates to a transcript of any of the above-mentioned DNAs.

A yet another aspect of the invention relates to a cell containing any of the above-mentioned DNAs, any of the above-mentioned expression vectors, or any of the above-mentioned transcripts.

A yet another aspect of the invention relates to a pharmaceutical composition containing, as an active ingredient, any of the above-mentioned DNAs, any of the above-mentioned expression vectors, any of the above-mentioned transcripts, or any of the above-mentioned cells.

A yet another aspect of the invention relates to a medicine containing any of the above-mentioned pharmaceutical compositions. This medicine may be an antitumor agent. In that case, a treatment target disease may be myelodysplastic syndrome (MDS), myeloid leukemia, lymphocytic leukemia, or uveal melanoma.

The invention has made it possible to provide a novel DNA, expression vector, transcript, cell, pharmaceutical composition, and medicine.

BRIEF DESCRIPTION OF THE DRAWINGS

FIG. 3A: the HSV-TK expression is induced by an SFFV promoter together with a puromycin resistance gene linked by a ribosomal skipping site P2A. An insertion position of an intron of each gene shown in FIG. 3B is indicated by a base length from 5' end of the HSV-TK gene.

DESCRIPTION OF THE PREFERRED EMBODIMENTS

Figure 1:
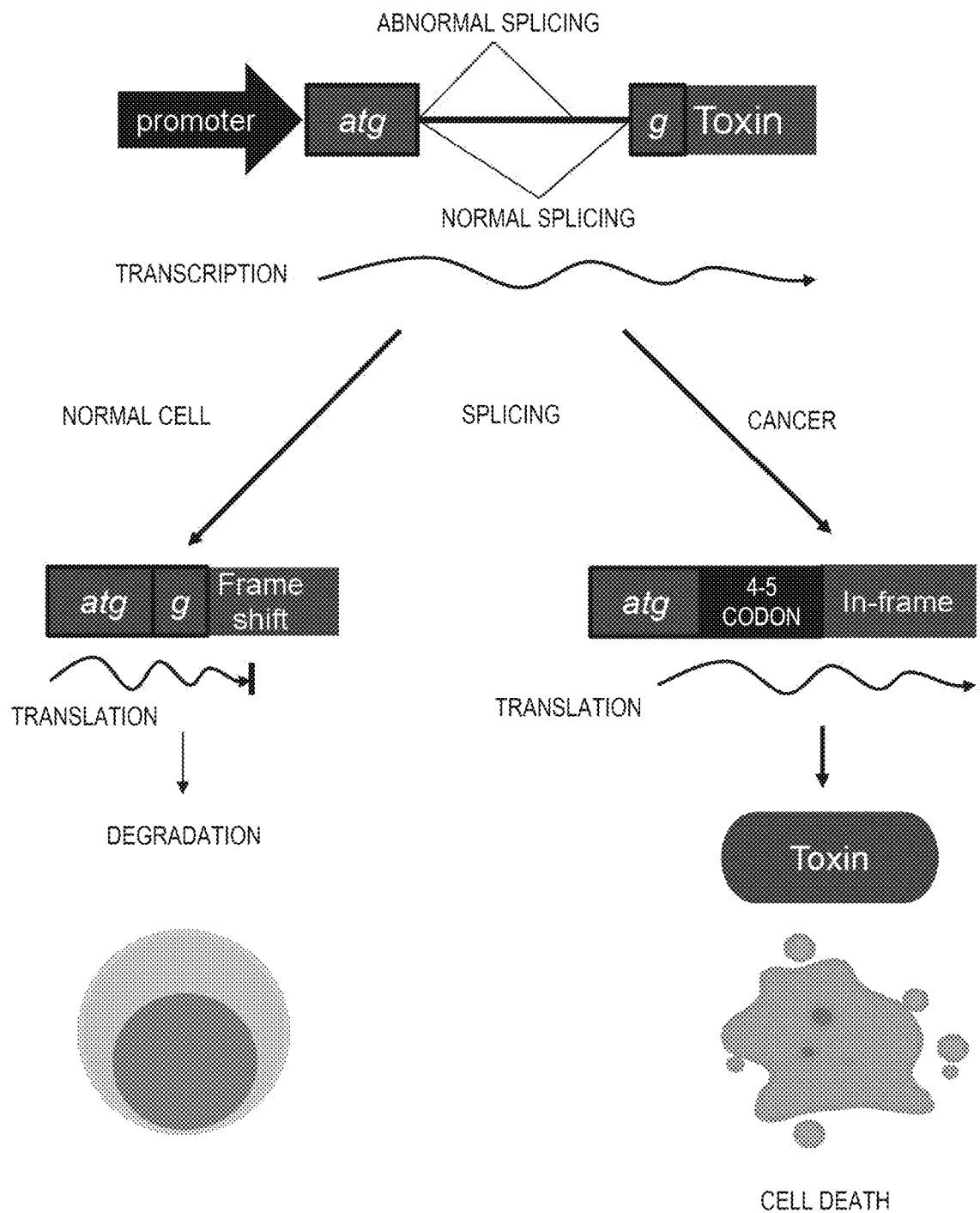
FIG. 1 is a schematic diagram of a recombinant gene having an intron sequence directly following an ATG of a suicide gene according to an embodiment of the invention, the intron sequence having an abnormal acceptor sequence 10- to 20-base upstream of a normal acceptor sequence and to be spliced in a cell with abnormal splicing. When normal splicing occurs, the entire intron sequence is removed, and when the abnormal splicing occurs, 10 to 20 bases on a 3' side of the intron sequence remain. A guanine is inserted right after an intron. Therefore, when the normal splicing occurs, a frame shift occurs and the suicide gene is not expressed, but when the abnormal splicing occurs, the full-length suicide gene is expressed as the functional protein because C-terminal half of the suicide gene is fused in-frame.

Hereinafter, an embodiment of the invention will be described in detail with reference to the drawings, and those skilled in the art can easily reproduce the invention from the present specification since objects, features, advantages, and ideas of the invention are apparent to those skilled in the art from the present specification. The embodiment and specific Examples of the invention described below are preferred embodiments of the invention, are presented for illustration or description, and are not intended to limit the invention thereto. It is apparent to those skilled in the art that various changes and modifications can be made based on the description in the present specification within the spirit and scope of the invention disclosed in the present specification.

(1) Recombinant Gene

A recombinant gene in an embodiment disclosed in the present specification is a DNA encoding a suicide gene having at least one intron sequence. The intron sequence has a donor sequence or an acceptor sequence to be used in a tumor cell with abnormal splicing a, not in a normal cell. In a transcript of the DNA, the suicide gene is expressed when the abnormal splicing occurs, and the suicide gene is not expressed when the abnormal splicing does not occur. In the present specification, "normal" means an event that occurs when a wild-type protein is generated from a wild-type gene, and "abnormal" means an event that occurs when a protein different from the wild-type protein is generated as a result of splicing different from splicing that occurs in a normal process. Here, the wild type may include a mutation other than a mutation caused by the abnormal splicing. For example, the normal cell refers to a cell in which splicing of a target gene occurs normally and the wild-type protein is generated, and an abnormal acceptor sequence refers to an acceptor sequence used in the splicing different from the splicing that occurs in a normal process.

The suicide gene is not particularly limited as long as the suicide gene is a gene that inhibits cell proliferation when a protein encoded by the suicide gene is expressed, and examples thereof include a gene encoding a cell death-inducing protein or a cell division-inhibiting protein. Alternatively, the suicide gene may be a gene encoding a protein that converts a precursor (for example, a prodrug) of a cell death-inducing compound or a cell division-inhibiting compound into the cell death-inducing compound or the cell division-inhibiting compound. Specifically, the suicide gene includes, but is not limited to, a gene encoding a herpes simplex virus type 1 thymidine kinase (HSV-TK), a cytosine deaminase (CD), an inducible caspase 9 (iCasp9), a streptolysin O, or a diphtheria toxin. Of these, those with drug-induced cytotoxicity are preferred. For example, since the HSV-TK converts a non-toxic ganciclovir (GCV) into a toxic phosphorylated metabolite, it is necessary to administer the GCV together in order to inhibit the cell proliferation. Further, since the CD converts non-toxic 5-fluorocytosine (5-FC) into toxic 5-fluorouracil (5-FU), it is necessary to administer the 5-FC together in order to inhibit the cell proliferation. Alternatively, the iCasp9, which is a fusion protein of a human caspase 9 and a recombinant human FK-binding protein, causes apoptotic cell death only when the iCasp9 is a dimer, and can therefore exhibit toxicity only when AP1903 or AP20187 that causes dimerization is administered (Karin C et al., Blood, 2005).

The tumor cell is not particularly limited as long as the tumor cell causes the abnormal splicing, and examples thereof include myelodysplastic syndrome (MDS), myeloid leukemia, lymphocytic leukemia, and uveal melanoma. A mechanism of the abnormal splicing is also not particularly limited, and the abnormal splicing is preferably caused by mutations in spliceosome constituent factors such as SF3B1, SRSF2, U2AF35, and ZRSR2.

The intron sequence is not particularly limited as long as the intron sequence is a sequence having a donor sequence or an acceptor sequence to be used in the abnormal splicing that occurs in the tumor cell and does not occur in the normal cell, and may be an intron sequence derived from a natural gene or an artificial sequence. Even being an artificial sequence, the intron sequence preferably has an identity of 60% or more, more preferably has an identity of 80% or more, still more preferably has an identity of 90% or more, even more preferably has an identity of 95% or more, and yet still more preferably has an identity of 99% or more with an intron sequence of a natural gene in a portion other than the donor sequence or acceptor sequence to be used in the abnormal splicing. Here, the identity can be evaluated by a known program.

It is known that splicing occurs in two stages, and a specific base called a branch point is involved in splicing in a first stage. Therefore, the intron sequence used in the recombinant gene of the disclosure preferably contains a branch point.

Specifically, examples of the intron sequence include a sequence selected from an intron of a gene encoding at least one protein selected from the group consisting of HINT2, DYNLL1, MAP3K7, BRD9, and TMEM14C. For example, the intron sequence may be sequences (SEQ ID NOs: 1 to 3) in which 30 to 70 base pairs from a 5' terminal and 30 to 90 base pairs from a 3' terminal are bound to each other in an intron between exons 4 and 5 of the HINT2 (NM_032593.3), an intron between exons 1 and 2 of the DYNLL1 (NM_003746.3), or an intron between exons 4 and 5 of the MAP3K7 (NM_003188.4). The intron sequence has one base (G in this case) inserted right after the intron sequence such that when the intron sequence has a normal acceptor sequence and normal splicing occurs in the normal cell, a frame shift occurs in the suicide gene and a normal protein is not expressed (FIG. 1). Therefore, a recombinant gene having the intron sequence does not influence the proliferation of the normal cell. In contrast, when an abnormal acceptor sequence in the intron is used and the splicing occurs in the tumor cell, C-terminal half of the suicide gene is fused in-frame, and the full-length suicide gene is expressed as the functional protein, so that the recombinant gene having the intron sequence inhibits the proliferation of the tumor cell (FIG. 1).

Figure 2:
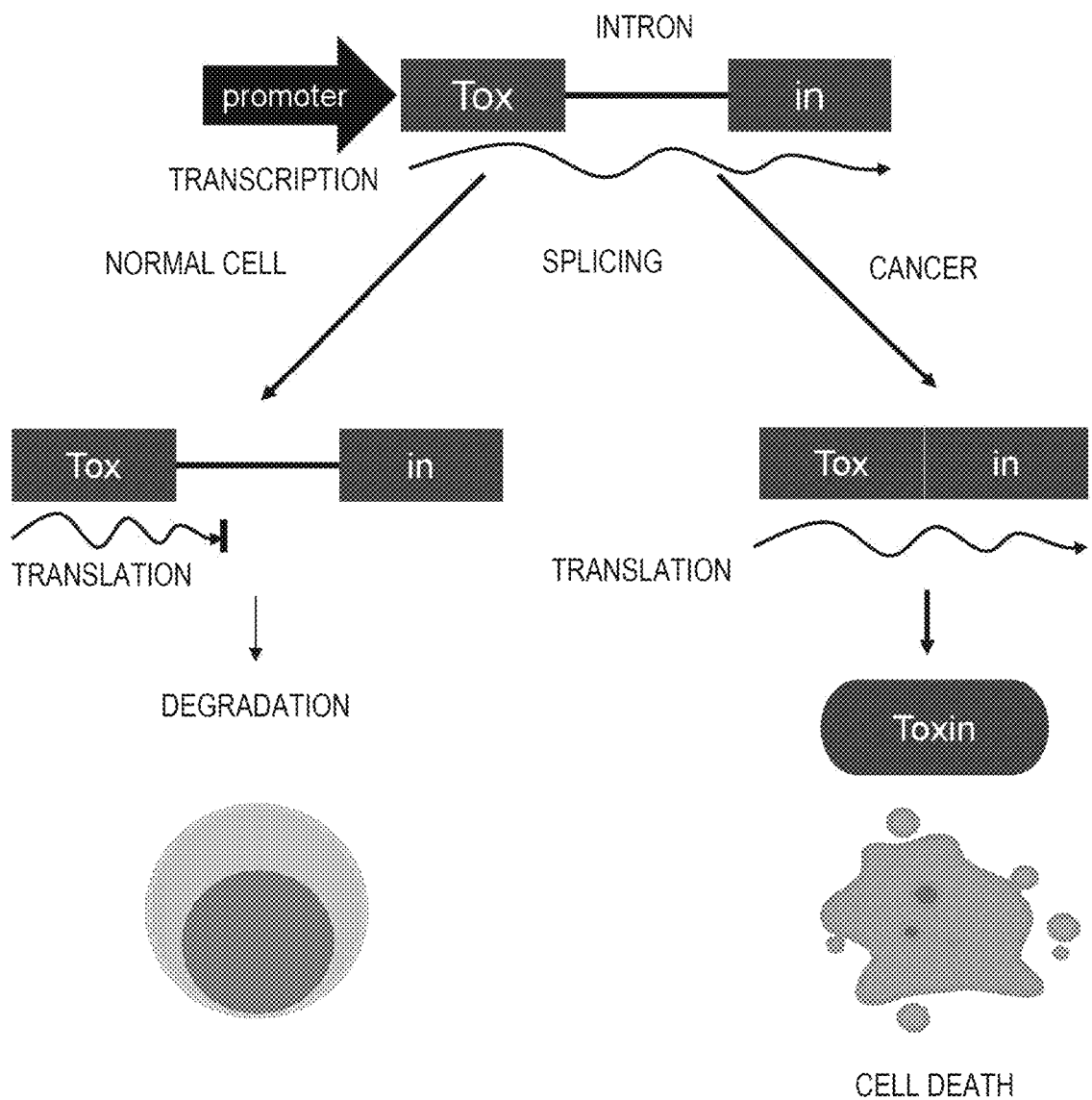
FIG. 2 is a schematic diagram of a recombinant gene having an intron sequence, in which splicing occurs only in the cell with abnormal splicing, inserted into the suicide gene according to the embodiment of the invention. When the splicing does not occur, translational arrest in the intron prevents the suicide gene expression. However, when the abnormal splicing occurs, the full-length suicide gene is expressed.

Another example of the intron sequence is a sequence (SEQ ID NO: 5) in which 30 to 70 bases from the 5' terminal of the intron between exons 1 and 2 of the TMEM14C (NM_016462.4) are bound to 20 to 50 bases from an abnormal acceptor sequence located about 13 to 20 bases upstream from the 3' terminal. Since the intron sequence does not have a normal acceptor sequence, in the normal cell, the inserted intron is not removed by splicing, translational arrest or the frame shift occurs within the intron, and the suicide gene is not expressed (FIG. 2). Therefore, a recombinant gene having the intron sequence does not influence the proliferation of the normal cell. In contrast, in the tumor cell, the abnormal acceptor sequence is used, the abnormal splicing occurs, and the intron is removed, so that the normal protein encoded by the suicide gene is expressed, and the recombinant gene having the intron sequence inhibits the proliferation of the tumor cell (FIG. 2).

Alternatively, the suicide gene sequence may have, as an intron sequence, a sequence (SEQ ID NO: 4) in which 39 bases from a 5' terminal and 82 bases from a 3' terminal of an intron between exons 14 and 15 of the BRD9 (XM_024446194.1) are bound to each other. In this case, in the normal cell, the intron is also not removed by splicing, and therefore, translational arrest occurs and the suicide gene is not expressed (FIG. 2). In contrast, in the tumor cell, the intron is removed by splicing and the suicide gene is expressed (FIG. 2).

For the sequences 1 to 4, the following sequences are particularly important, and in the following, the sequence preferably has an identity of 60% or more, more preferably has an identity of 80% or more, still more preferably has an identity of 90% or more, even more preferably has an identity of 95% or more, and yet still more preferably has an identity of 99% or more.

SEQ ID NO: 6: sequence from a branch point of an intron to a normal acceptor site of the HINT2 (including a base of the branch point and an acceptor sequence, and the same applies hereinafter)

SEQ ID NO: 7: sequence from a branch point of an intron to a normal acceptor site of the DYNLL1

SEQ ID NO: 8: sequence from a branch point of an intron to a normal acceptor site of the MAP3K7

SEQ ID NO: 9: sequence from a branch point of an intron to an abnormal acceptor site of the BRD9 containing no normal acceptor sequence SEQ ID NO: 10: sequence from a branch point of an intron to an abnormal acceptor site of the TMEM14C containing no normal acceptor sequence An expression vector disclosed in the present specification can express the above-mentioned recombinant suicide gene intracellularly. Examples of the expression vector include a plasmid vector and a viral vector (for example, vectors derived from an adenovirus, a vaccinia virus, a lentivirus, a herpes simplex virus, a baculovirus, a retrovirus, an adeno-associated virus (AAV), rhinovirus, a human immunodeficiency virus (HIV), a Sendai virus, and a filovirus). A vector derived from an AAV, an adenovirus, or a Sendai virus, which has high introduction efficiency and is not incorporated into a genome, is particularly preferred.

These expression vectors have a promoter for expressing the recombinant gene.

(2) Medicine

A pharmaceutical composition disclosed in the present specification may contain, as an active ingredient, the above-mentioned recombinant gene, an expression vector containing the recombinant gene, or a transcript (mRNA and precursor) of the recombinant gene. In addition to these, the pharmaceutical composition may include a delivery agent for administering the DNA to a patient. Known delivery agents can be used, and examples thereof include exosomes, virosomes, lipid nanoparticles, and liposomes.

Further, the pharmaceutical composition disclosed in the present specification may contain, as an active ingredient, a cell containing the above-mentioned recombinant gene, an expression vector containing the recombinant gene, or a transcript (mRNA and precursor) of the recombinant gene. The cell can be used, for example, as follows. In adminis-tration of a large dose of an anticancer drug or autologous hematopoietic stem cell transplantation after systemic radiation therapy, the above-mentioned DNA vector is introduced into a pre-collected hematopoietic stem cell ex vivo to kill the tumor cell and to allow only the normal cell to survive, which makes it possible to obtain only a normal hematopoietic stem cell, and then the obtained normal hematopoietic stem cell is re-transplanted into the patient.

The pharmaceutical composition of the disclosure can be used as a medicine and a target disease is not limited as long as it is a disease caused by the abnormal splicing. It is particularly preferable to use the pharmaceutical composition as an antitumor agent. The tumor cell is not particularly limited as long as the abnormal splicing occurs, and examples thereof include myelodysplastic syndrome (MDS), myeloid leukemia, lymphocytic leukemia, and uveal melanoma. The mechanism of the abnormal splicing is also not particularly limited, and the abnormal splicing is preferably caused by mutations in spliceosome constituent factors (SF3B1, SRSF2, U2AF35, ZRSR2, and the like).

Example 1

Figure 3A:
FIG. 3A shows a vector map of an HSV-TK expression vector and FIG. 3B shows a diagram of an intron insertion position in a sequence of HSV-TK gene in Examples of the invention.
Figure 3B:
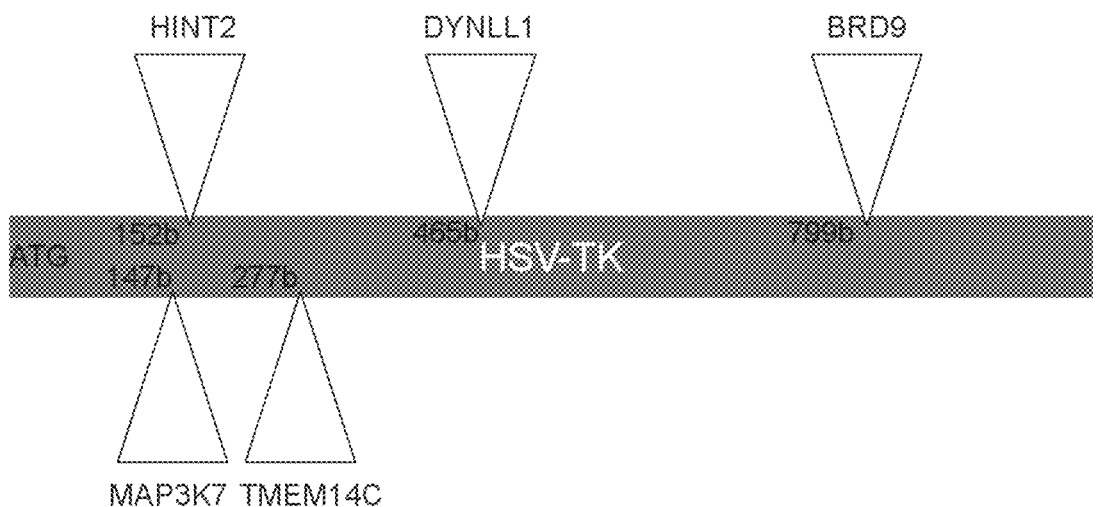
Figure 4:
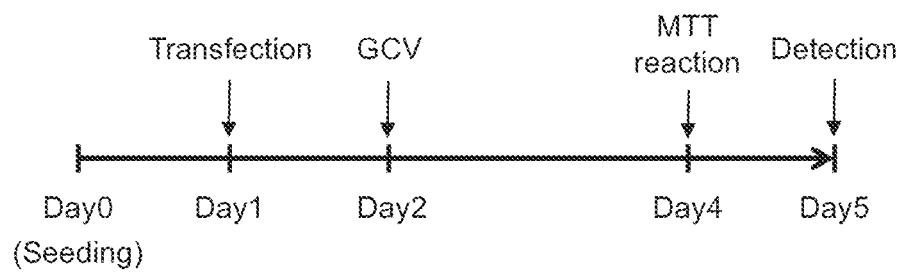
FIG. 4 is a diagram showing an experiment time schedule in Examples of the invention.

In this example, in order to verify toxicity of a suicide gene in a cell expressing an SF3B1 K700E mutant, pHR-SFFVp-SF3B1 K700E (SEQ ID NO: 18), pHR-SFFVp-HSVTK-puro containing each intron (FIGS. 3A and 3B; SEQ ID NOs: 11 to 15), and pHR-SFFVp-HSVTK-puro as an intron-free control (SEQ ID NO: 16) were cotransfected into HEK293FT cells (Thermo Fisher Scientific Inc.), and the number of cells killed by addition of GCV was quantified using an MTT assay method. A detailed procedure will be shown below. A time schedule is shown in FIG. 4. Further, the base sequences used will be described below.

SEQ ID NO: 11: sequence in which an SFFV promoter, an HSV-TK inserted with an intron of BRD9 containing no normal acceptor sequence, and a puromycin resistance gene linked to the HSV-TK by a P2A sequence are linked to one another SEQ ID NO: 12: sequence in which an SFFV promoter, an HSV-TK inserted with an intron of TMEM14C containing no normal acceptor sequence, and a puromycin resistance gene linked to the HSV-TK by a P2A sequence are linked to one another SEQ ID NO: 13: sequence in which an SFFV promoter, an HSV-TK inserted with an intron of HINT2 containing a normal acceptor sequence (SEQ ID NO: 1), and a puromycin resistance gene linked to the HSV-TK by a P2A sequence are linked to one another SEQ ID NO: 14: sequence in which an SFFV promoter, an HSV-TK inserted with an intron of DYNLL1 containing a normal acceptor sequence (SEQ ID NO: 2), and a puromycin resistance gene linked to the HSV-TK by a P2A sequence are linked to one another SEQ ID NO: 15: sequence in which an SFFV promoter, an HSV-TK inserted with an intron of MAP3K71 containing a normal acceptor sequence (SEQ ID NO: 3) at a position 5, and a puromycin resistance gene linked to the HSV-TK by a P2A sequence are linked to one another SEQ ID NO: 16: sequence in which an SFFV promoter, an HSV-TK, and a puromycin resistance gene linked to the HSV-TK by a P2A sequence are linked to one another A specific experimental method will be described in detail below.

First, HEK293FT cells of $1\times10^6$ cells/mL, which were suspended in a DMEM medium (cDMEM medium) containing 10% bovine serum (Corning Inc.) and penicillinstreptomycin (Nacalai Tesque Inc.), were seeded in a 96-well plate at 50 μL/well and cultured in a cell culture device adjusted to 37° C. and a $CO_2$ concentration of 5%.

After 24 hours, 50 ng of pHR-SFFVp-SF3B1 WT (a wild-type SF3B1 with a FLAG tag added to an N terminal and the amino acid sequence thereof was shown in SEQ ID NO: 19) (SEQ ID NO: 17) or pHR-SFFVp-SF3B1 K700E (SF3B1 K700E with a FLAG tag added to an N-terminal and the amino acid sequence thereof was shown in SEQ ID NO: 20) (SEQ ID NO: 18) and 50 ng of each pHR-SFFVp-HSVTK-puro (SEQ ID NOs: 11 to 16) were cotransfected into the HEK293FT cells by using Lipofectamine 3000, and then cultured in the cell culture device adjusted to 37° C. and a $CO_2$ concentration of 5%.

After 24 hours, a culture supernatant was completely removed and the medium was replaced with cDMEM media each containing 100 μL of GCV (GCV final concentration: 500 μg/mL, 100 μg/mL, 20 μg/mL, 0 μg/mL). Then, the HEK293FT cells were cultured in the cell culture device adjusted to 37° C. and a $CO_2$ concentration of 5%.

After 48 hours, the HEK293FT cells were suspended in the cDMEM medium and a cell concentration was adjusted to $20 \times 10^5$ cells/mL, $10 \times 10^5$ cells/mL, $5 \times 10^5$ cells/mL, $2.5 \times 10^5$ cells/mL, $1.25 \times 10^5$ cells/mL, and $0 \times 10^5$ cells/mL, and then the HEK293FT cells were seeded in a 96-well plate at 100 μL/well to obtain a standard for measuring the number of cells.

An MTT solution of an MTT cell number measuring kit (Nacalai Tesque Inc.) was added into the HEK293FT cells at 10 μL/well, and the mixture was cultured in the cell culture device adjusted to 37° C. and a $CO_2$ concentration of 5% for 4 hours.

A solubilized solution of the MTT cell number measuring kit (Nacalai Tesque Inc.) was added into the HEK293FT cells at 100 μL/well, and the mixture was incubated for 20 hours at 37° C. in a moist environment.

An absorbance at 570 nm (reference wavelength: 655 nm) was measured with a microplate reader (SH-9000Lab, manufactured by Hitachi High-Tech Corporation).

Figure 5:
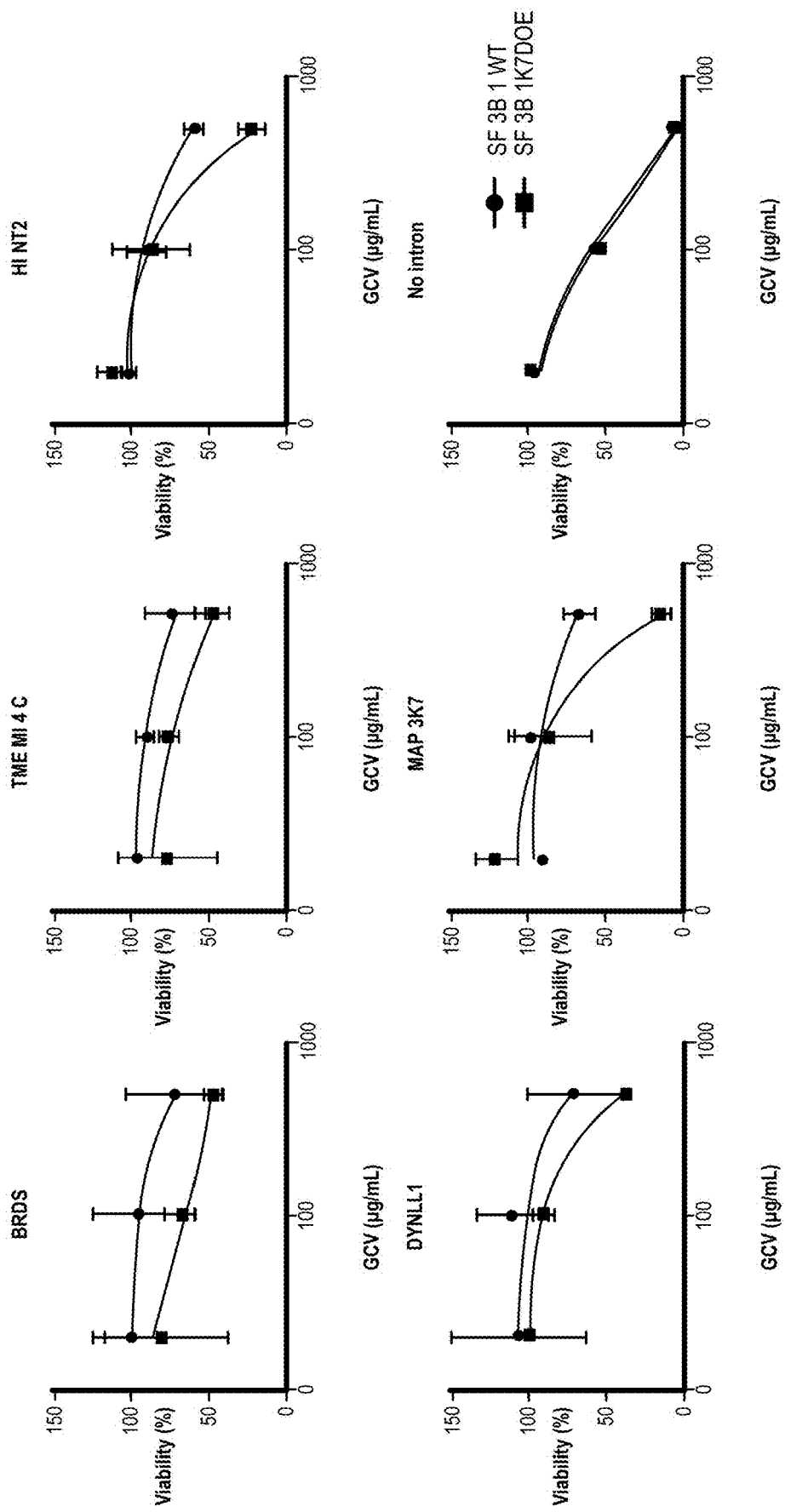
FIG. 5 shows graphs showing results of measuring GCV-concentration-dependent cell death in Examples of the invention. A change in number of cells based on the number of cells to which GCV is not added is shown as a viability (%). ■ indicates an SF3B1 K700E mutant expression group, and ● indicates an wild-type SF3B1 overexpression group as a control.

The number of viable cells was calculated based on a standard curve using the above-mentioned serially diluted HEK293FT cells, and a viability was shown as a ratio when the number of cells in a GCV-free group was 100%. Further, specific cytotoxicity in an abnormal splicing cell was evaluated as efficacy by comparison with a control group expressing SF3B1WT (SEQ ID NO: 17). FIG. 5 shows results under each condition.

As shown in FIG. 5, under each condition, due to the suicide gene containing each intron, the viability in the cell having an abnormal splicing mechanism was lower than in a normal cell having no such a mechanism.

Example 2

In this example, in order to verify the toxicity of a suicide gene in a cell having an SF3B1 K700E mutation in one allele in a genome, as in actual cancer cells, HEK293FT cells were genome-edited and an SF3B1 K700E mutant cell strain was established.

Meanwhile, an HSV-TK expression lentiviral vector containing the BRD9 intron was prepared using the pHR vector shown in SEQ ID NO: 11 (FIGS. 3A and 3B). The lentiviral vector was introduced into the SF3B1 K700E mutant strain and an SF3B1 normal strain as a control, and the number of cells killed by the addition of GCV was quantified using the MTT assay method. A detailed procedure will be shown below.

First, HEK293FT cells of $1 \times 10^6$ cells/mL suspended in a cDMEM medium were seeded in a 6-well plate at 1.5 mL/well and cultured in a cell culture device adjusted to 37° C. and a $CO_2$ concentration of 5%.

After 24 hours, 6.25 μg of TrueCut Cas9 Protein v2 (Thermo Fisher Scientific Inc.), 1.2 μg of a guide RNA (AACUUCUGCUCAUCCA) (SEQ ID NO: 21) for SF3B1, and 100 pmol of ssODN (single-stranded DNA: SEQ ID NO: 22) for the SF3B1 K700E mutation were cotransfected into the HEK293FT cells by using Lipofectamine CRISPRMAX (Thermo Fisher Scientific Inc.) and then cultured in the cell culture device adjusted to 37° C. and a $CO_2$ concentration of 5%.

After 24 hours, a culture supernatant was removed, and the HEK293FT cells were separated into single cells with a trypsin-EDTA solution (Nacalai Tesque Inc.) and diluted to 2 cells per 10 wells, and then seeded in a 96-well plate. Then, the SF3B1 K700E mutant strain was screened out by direct sequencing around SF3B1 K700E in wells where cell colonies were obtained, and the obtained mutant strain was propagated.

Figure 6:
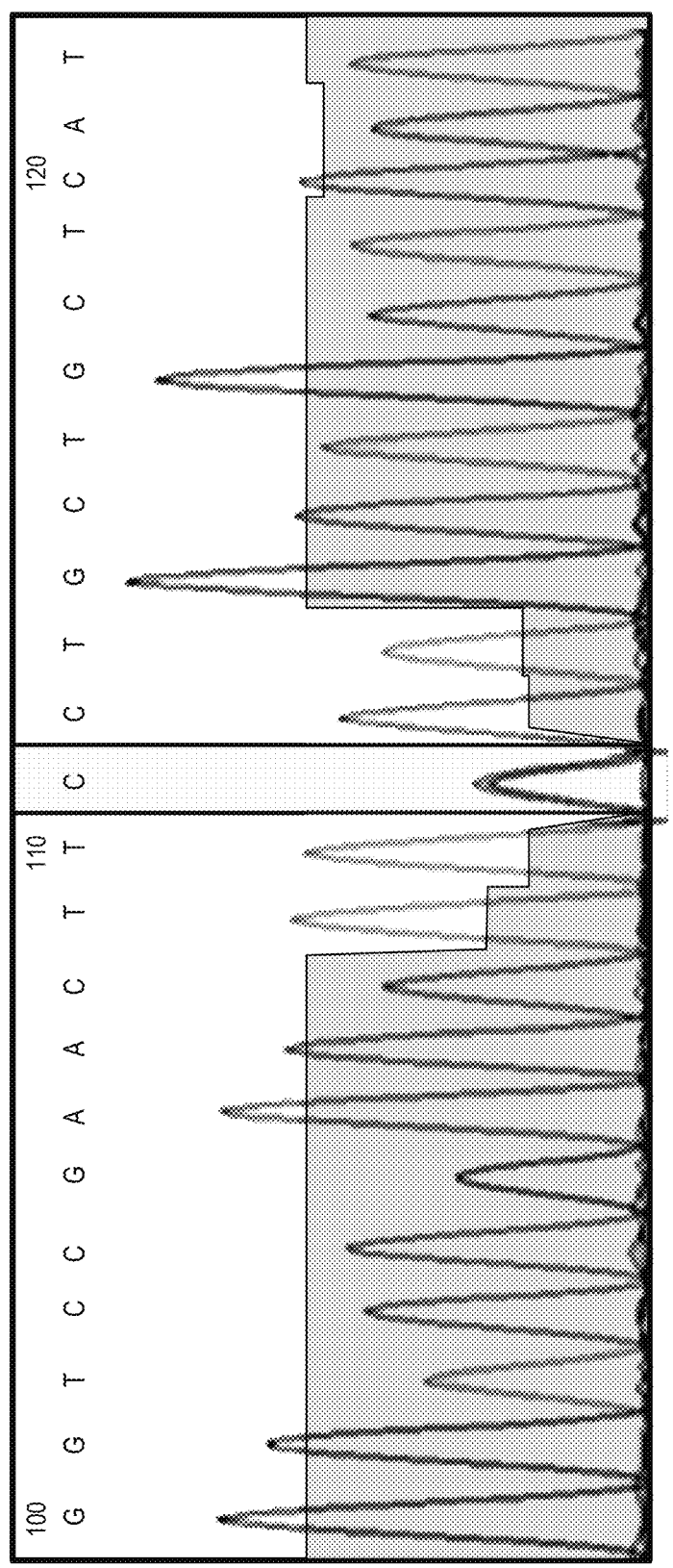
FIG. 6 shows a DNA sequencing result of an HEK293FT cell in which an SF3B1 K700E mutation is introduced into one allele by genome editing in Examples of the invention. It can be seen that C and T overlap each other at the 111th position.

In the direct sequencing, a genome of cells extracted with an alkaline heat extraction method was amplified by a PCR reaction using KOD One (TOYOBO CO., LTD.) and primers (GTTGATATATTGAGAGAATCTGGATG (SEQ ID NO: 23) and AAATCAAAAGGTAATTGGTGGA (SEQ ID NO: 24)), the obtained amplification product was purified and a base sequence was determined by using the amplification product as a template. The base sequence obtained at that time is shown in FIG. 6. In this way, it can be confirmed that the SF3B1 K700E mutation is actually introduced into the one allele.

Next, in order to prepare a lentivirus, HEK293FT cells of $1.2 \times 10^6$ cells/mL suspended in a cDMEM medium were seeded in a T25 flask at 4 mL/well and then cultured in a cell culture device adjusted to 37° C. and a $CO_2$ concentration of 5%.

After 24 hours, an HSV-TK expression vector (pHR-SFFVp-HSVTK-puro containing the BRD9 intron: SEQ ID NO: 11) and a packaging vector (pCMVR8.74 and pMD2.G, pAdVAntage) were cotransfected into the HEK293FT cells using 1 mg/mL of a Polyethylenimine solution (Polysciences Inc.), and then cultured in the cell culture device adjusted to 37° C. and a $CO_2$ concentration of 5%. After 24 hours, the medium was replaced with a fresh cDMEM medium and the culture supernatant was collected after 48 hours and 72 hours.

The collected culture supernatants were added to an SF3B1 K700E mutant cell derived from the HEK293FT cells and a SF3B1 normal cell to infect the prepared lentivirus.

After 48 hours, puromycin was added so as to have a final concentration of 4 μg/mL, and the cells were further cultured for 48 hours to select only transduced cells.

The obtained SF3B1 K700E mutant cell derived from the HEK293FT cells expressing an HSV-TK containing the BRD9 intron and the obtained SF3B1 normal cell expressing the HSV-TK containing the BRD9 intron were suspended in a cDMEM medium with the cell concentration adjusted to $4 \times 10^5$ cells/mL, and then seeded in a 96-well plate at 50 μL/well.

50 μL of cDMEM media each containing GCV (GCV final concentration: 100 μg/mL, 20 μg/mL, 4 μg/mL, 0.8 μg/mL, 0.16 μg/mL, 0 μg/mL) were added, and then the mixture was cultured in the cell culture device adjusted to 37° C. and a $CO_2$ concentration of 5%.

After 48 hours, the HEK293FT cells were suspended in the cDMEM medium and the cell concentration was adjusted to $40×10^5$ cells/mL, $20×10^5$ cells/mL, $10×10^5$ cells/mL, $5×10^5$ cells/mL, $2.5×10^5$ cells/mL, $1.25×10^5$ cells/mL, $0.625×10^5$ cells/mL, and $0×10^5$ cells/mL, and then seeded in a 96-well plate at 100 µL/well and used as a standard for measuring the number of cells.

The MTT solution of the MTT cell number measuring kit (Nacalai Tesque Inc.) was added into the HEK293FT cells at 10 µL/well, and the mixture was cultured in the cell culture device adjusted to 37° C. and a $CO_2$ concentration of 5% for 4 hours.

The solubilized solution of the MTT cell number measuring kit (Nacalai Tesque Inc.) was added into the HEK293FT cells at 100 µL/well, and the mixture was incubated at 37° C. After 20 hours, the absorbance at 570 nm (reference wavelength: 655 nm) was measured with the microplate reader.

Figure 7:
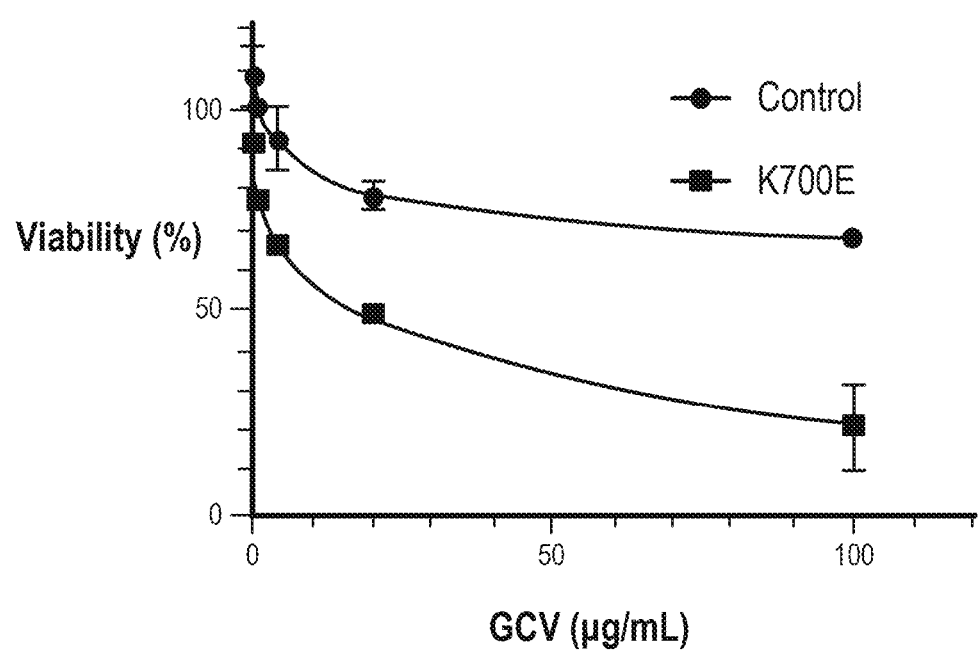
FIG. 7 is a graph showing a result of measuring the GCV-concentration-dependent cell death in Examples of the invention. The change in number of cells based on the number of cells to which GCV is not added is shown as the viability (%). ■ indicates a result of an SF3B1 K700E mutant cell, and ● indicates a result of an SF3B1 normal cell as a control.

The number of viable cells was calculated based on a standard curve using the above-mentioned serially diluted HEK293FT cells, and the viability was shown as a ratio when the number of cells in the GCV-free group was 100%. Further, the efficacy was evaluated by comparing the cytotoxicity due to GCV addition in the SF3B1 normal cell with the cytotoxicity of the SF3B1 K700E mutant cell. FIG. 7 is a graph showing the viability of the SF3B1 K700E mutant cell and the viability of the normal cell.

As shown in FIG. 7, the SF3B1 K700E mutant cell mutated due to the suicide gene containing the BRD9 intron had a viability lower than that of the SF3B1 normal cell.

What is claimed is:

1. A DNA encoding a suicide gene comprising:
   at least one artificial intron comprising a nucleotide sequence having at least 90% sequence identity to a sequence selected from the group consisting of SEQ ID NO 6, SEQ ID NO 7, SEQ ID NO 8, SEQ ID NO 9, and SEQ ID NO 10,
   wherein the intron sequence has a donor sequence or an acceptor sequence, wherein the donor sequence or the acceptor sequence is used in abnormal splicing that occurs in a tumor cell and does not occur in a normal cell, and
   in a transcript of the DNA,
   the suicide gene is expressed when the abnormal splicing occurs, and
   the suicide gene is not expressed when the abnormal splicing does not occur.

2. The DNA according to claim 1, wherein
   the intron sequence includes a sequence selected from introns of genes encoding at least one protein selected from the group consisting of DYNLL1, HINT2, MAP3K7, TMEM14C, and BRD9.

3. The DNA according to claim 1, wherein
   the suicide gene encodes a cell death-inducing protein, a cell division-inhibiting protein, or a protein that converts a precursor of a cell death-inducing compound or a cell division-inhibiting compound into the cell death-inducing compound or the cell division-inhibiting compound.

4. The DNA according to claim 1, wherein
   the suicide gene is a gene encoding a protein selected from the group consisting of a herpes simplex virus type 1 thymidine kinase (HSV-TK), a cytosine deaminase (CD), an inducible caspase 9 (iCasp9), a streptolysin O, and a diphtheria toxin.

5. The DNA according to claim 1, wherein
   the intron sequence has a branch point.

6. An expression vector comprising:
   the DNA according to claim 1.

7. The expression vector according to claim 6, further comprising:
   a promoter that specifically controls transcription of the suicide gene in the tumor cell.

8. The expression vector according to claim 6, further comprising:
   a promoter that controls transcription in a eukaryotic cell.

9. The expression vector according to claim 6, further comprising:
   a promoter that specifically controls transcription in a hematopoietic stem cell or a melanocyte.

10. A cell comprising:
    the DNA of claim 1.

11. A pharmaceutical composition comprising:
    the DNA according to claim 1.

12. An antitumor agent comprising:
    a therapeutically effective amount of the pharmaceutical composition to treat a tumor as the antitumor agent according to claim 11.

13. The antitumor agent according to claim 12, wherein
    a treatment target disease is myelodysplastic syndrome (MDS), myeloid leukemia, lymphocytic leukemia, or uveal melanoma.

* * * * *